(12) United States Patent
Sorrentino

(10) Patent No.: US 10,390,204 B2
(45) Date of Patent: Aug. 20, 2019

(54) RESOURCE PATTERNS FOR DISCOVERY

(71) Applicant: TELEFONAKTIEBOLAGET L M ERICSSON (PUBL), Stockholm (SE)

(72) Inventor: Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 188 days.

(21) Appl. No.: 15/315,769

(22) PCT Filed: Jun. 4, 2015

(86) PCT No.: PCT/IB2015/054241
§ 371 (c)(1),
(2) Date: Dec. 2, 2016

(87) PCT Pub. No.: WO2015/186096
PCT Pub. Date: Dec. 10, 2015

(65) Prior Publication Data
US 2017/0118621 A1    Apr. 27, 2017

Related U.S. Application Data

(60) Provisional application No. 62/007,453, filed on Jun. 4, 2014.

(51) Int. Cl.
*H04W 76/14*     (2018.01)
*H04W 8/00*      (2009.01)
(Continued)

(52) U.S. Cl.
CPC ........... *H04W 8/005* (2013.01); *H04L 5/0007* (2013.01); *H04W 72/0446* (2013.01);
(Continued)

(58) Field of Classification Search
CPC .............................. H04W 8/005; H04W 76/14
See application file for complete search history.

(56) References Cited

U.S. PATENT DOCUMENTS

2016/0157254 A1* 6/2016 Novlan ................. H04W 76/14
370/329

OTHER PUBLICATIONS

Asustek: "Type 2B Discovery with Resource Hopping", 3GPP Draft; R1-140293 Type 2B Discovery, With Resource Hopping, 3rd Generation Partnership Project (3GPP), Mobile Competence Centre; 650, Route Des Lucioles; F-06921 Sophia-Antipolis Cedex;France vol. RAN WG1, no. Prague, Czech Republic; Feb. 10, 2014-Feb. 14, 2014 Feb. 9, 2014 (Feb. 9, 2014), XP050735843, Retrieved from the Internet: URL:http://www.3gpp.org/ftp/Meetings_3GPP_SYNC/RAN/RAN1/Docs/ [retrieved on Feb. 9, 2014] section 1, section 3; figure 7.

(Continued)

*Primary Examiner* — Angel T Brockman
(74) *Attorney, Agent, or Firm* — Patent Portfolio Builders, PLLC

(57) ABSTRACT

Systems and methods are disclosed herein that relate to assigning Device-to-Device (D2D) resource patterns to wireless devices, or User Equipment devices (UEs), and using the assigned D2D resource patterns. In some embodiments, a wireless device having cellular network assisted D2D communication capabilities is operable to transmit a D2D signal in a frequency band of a cellular network during a predefined D2D period according to one of a plurality of predefined D2D transmission patterns. The plurality of predefined D2D transmission patterns has at least one of (i.e., one or more of) a number of properties disclosed herein.

20 Claims, 18 Drawing Sheets

(51) Int. Cl.
H04L 5/00 (2006.01)
H04W 72/04 (2009.01)
H04W 84/12 (2009.01)

(52) U.S. Cl.
CPC ....... H04W 72/0453 (2013.01); H04W 76/14 (2018.02); H04W 72/042 (2013.01); H04W 84/12 (2013.01)

(56) References Cited

OTHER PUBLICATIONS

NTT Docomo et al: "Discussion on Inter-cell Type 2B Discovery". 3GPP Draft: R1-142268 Discussion on Inter-Cell Type 2B Discovery. 3rd Generation Partnership Project (3GPP). Mobile Competence Centre ; 650, Route Des Lucioles ; F-06921 Sophia-Antipolis Cedex ;Franc • vol. RAN WG1. no. Seoul. Korea; May 19, 2014-May 23, 2014 May 18, 2014 (May 18, 2014). XP050789385, Retrieved from the Internet: URL:http://www.3gpp.org/ftp/Meetings 3GPP SYNC/RAN1/RAN1/Docs/ [retrieved on May 18, 2014] section 3; figure 3.

Asustek: "On the Use of Type 2B Discovery". 3GPP Draft; R1-140292 on the Use of Type 2B Discovery, 3rd Generation Partnership Project (3GPP). Mobile Competence Centre; 650, Route Des Lucioles; F-06921 Sophia-Antipolis Cedex ; France • vol. RAN WG1. no. Prague. Czech Republic; Feb. 10, 2014-Feb. 14, 2014 Feb. 9, 2014 (Feb. 9, 2014). XP050735842, Retrieved from the Internet: URL:http://www.3gpp.org/ftp/Meetings 3GPP SYNC/RAN/RAN1/Docs/ [retrieved on Feb. 9, 2014] sections 1, 2.2,2.3; figures 1, 3.

Office Action in application No. 15728648.5 dated Dec. 8, 2017 4 pages.

Office Action in application No. 15728648.5 dated Jun. 25, 2018 4 pages.

Ericsson: "Discovery Resource Allocation", 3GPP Draft; R1-142403 Discovery Resource Allocation, 3rd Generation Partnership Project (3GPP), vol. RAN WG1, May 19, 2014, XP050789521, Retrieved from the Internet: URL:http://www.3gpp.org/ftp/Meetings_3GPP SYNC/RAN1/RAN1/Docs/.

* cited by examiner

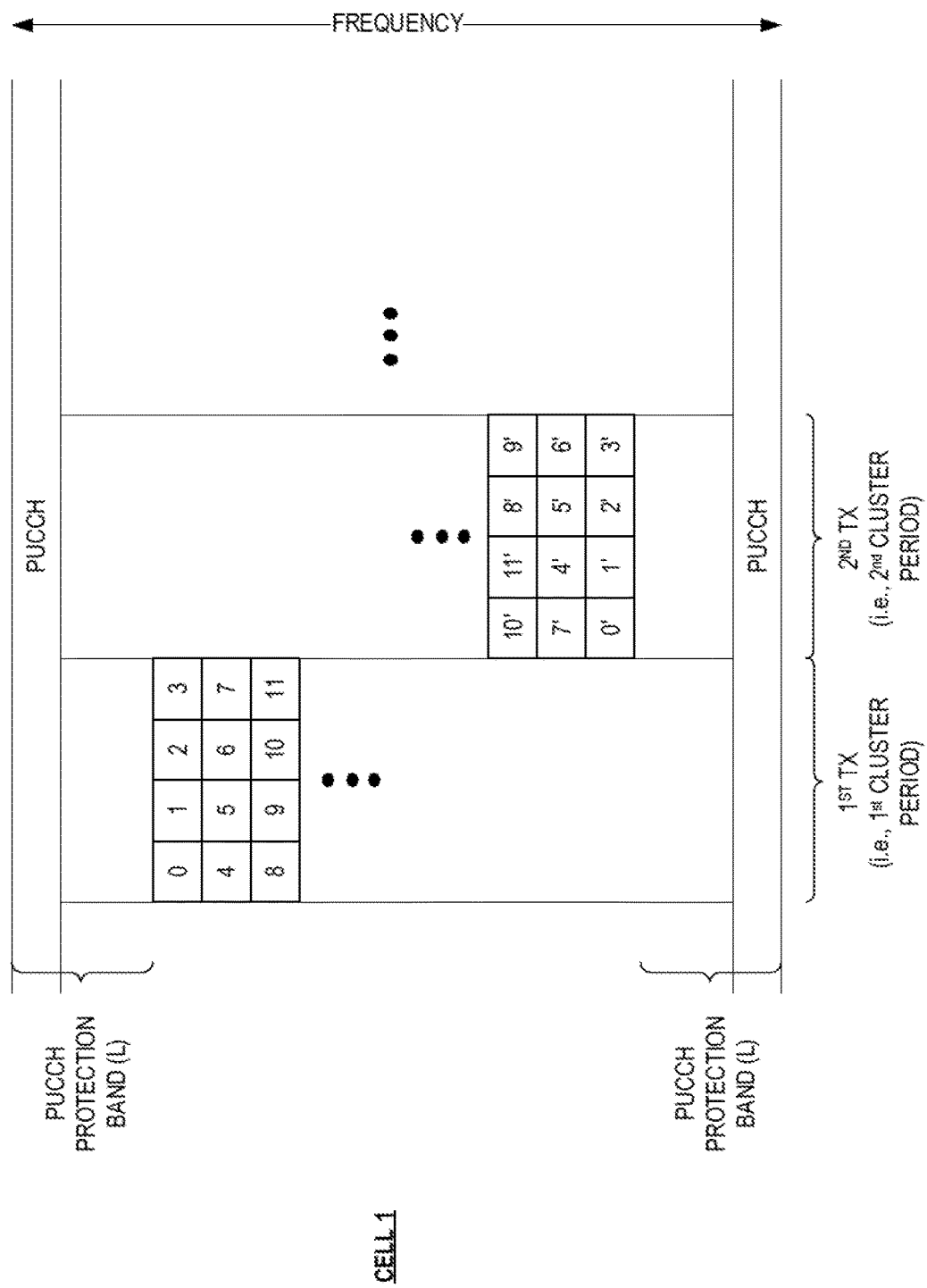

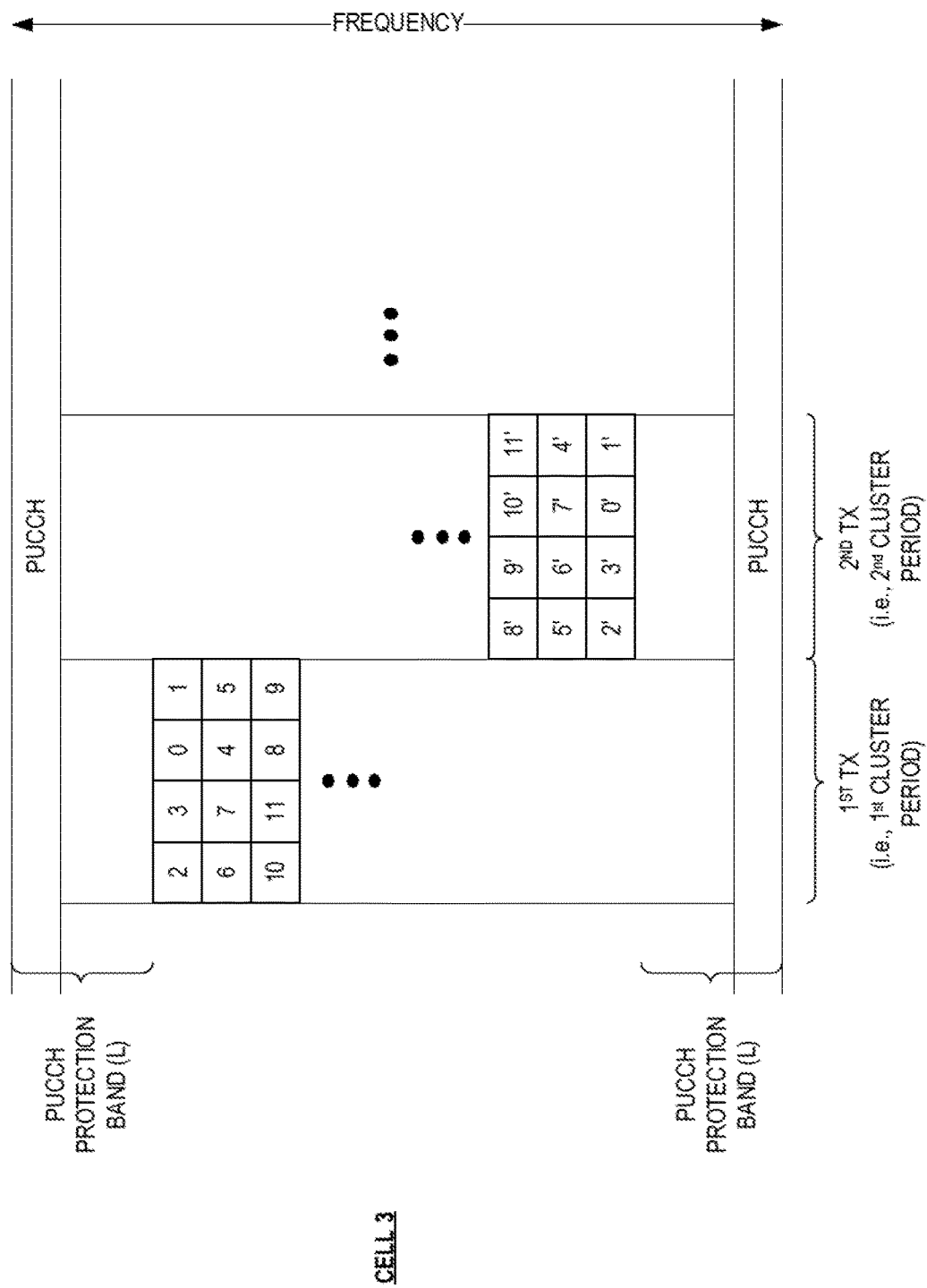

| | t=0 | t=1 | t=2 | t=3 | t=4 | t=5 | t=6 | t=7 | t=8 | t=9 | t=10 | t=11 | t=12 | t=13 | t=14 | t=15 |
|---|---|---|---|---|---|---|---|---|---|---|---|---|---|---|---|---|
| f=0 | | | | | | | | | | | | | | | | |
| f=1 | | | | | | | | | | | | | | | | |
| f=2 | 0 | 1 | 2 | 3 | 4 | 5 | 6 | 7 | 8 | 9 | 10 | 11 | 12 | 13 | 14 | 15 |
| f=3 | 16 | 17 | 18 | 19 | 20 | 21 | 22 | 23 | 24 | 25 | 26 | 27 | 28 | 29 | 30 | 31 |
| f=4 | 32 | 33 | 34 | 35 | 36 | 37 | 38 | 39 | 40 | 41 | 42 | 43 | 44 | 45 | 46 | 47 |
| f=5 | 48 | 49 | 50 | 51 | 52 | 53 | 54 | 55 | 56 | 57 | 58 | 59 | 60 | 61 | 62 | 63 |
| f=6 | 64 | 65 | 66 | 67 | 68 | 69 | 70 | 71 | 72 | 73 | 74 | 75 | 76 | 77 | 78 | 79 |
| f=7 | 80 | 81 | 82 | 83 | 84 | 85 | 86 | 87 | 88 | 89 | 90 | 91 | 92 | 93 | 94 | 95 |
| f=8 | 96 | 97 | 98 | 99 | 100 | 101 | 102 | 103 | 104 | 105 | 106 | 107 | 108 | 109 | 110 | 111 |
| f=9 | 112 | 113 | 114 | 115 | 116 | 117 | 118 | 119 | 120 | 121 | 122 | 123 | 124 | 125 | 126 | 127 |
| f=10 | 128 | 129 | 130 | 131 | 132 | 133 | 134 | 135 | 136 | 137 | 138 | 139 | 140 | 141 | 142 | 143 |
| f=11 | 144 | 145 | 146 | 147 | 148 | 149 | 150 | 151 | 152 | 153 | 154 | 155 | 156 | 157 | 158 | 159 |
| f=12 | 160 | 161 | 162 | 163 | 164 | 165 | 166 | 167 | 168 | 169 | 170 | 171 | 172 | 173 | 174 | 175 |
| f=13 | 176 | 177 | 178 | 179 | 180 | 181 | 182 | 183 | 184 | 185 | 186 | 187 | 188 | 189 | 190 | 191 |
| f=14 | 192 | 193 | 194 | 195 | 196 | 197 | 198 | 199 | 200 | 201 | 202 | 203 | 204 | 205 | 206 | 207 |
| f=15 | 208 | 209 | 210 | 211 | 212 | 213 | 214 | 215 | 216 | 217 | 218 | 219 | 220 | 221 | 222 | 223 |
| f=16 | 224 | 225 | 226 | 227 | 228 | 229 | 230 | 231 | 232 | 233 | 234 | 235 | 236 | 237 | 238 | 239 |
| f=17 | 240 | 241 | 242 | 243 | 244 | 245 | 246 | 247 | 248 | 249 | 250 | 251 | 252 | 253 | 254 | 255 |
| f=18 | 256 | 257 | 258 | 259 | 260 | 261 | 262 | 263 | 264 | 265 | 266 | 267 | 268 | 269 | 270 | 271 |
| f=19 | 272 | 273 | 274 | | | 277 | 278 | 279 | 280 | 281 | 282 | 283 | 284 | 285 | 286 | 287 |
| f=20 | | | | | | | | | | | | | | | | |
| f=21 | | | | | | | | | | | | | | | | |

| | t=16 | t=17 | t=18 | t=19 | t=20 | t=21 | t=22 | t=23 | t=24 | t=25 | t=26 | t=27 | t=28 | t=29 | t=30 | t=31 |
|---|---|---|---|---|---|---|---|---|---|---|---|---|---|---|---|---|
| f=0 | | | | | | | | | | | | | | | | |
| f=1 | | | | | | | | | | | | | | | | |
| f=2 | 287 | 272 | 273 | 274 | 275 | 276 | 277 | 278 | 279 | 280 | 281 | 282 | 283 | 284 | 285 | 286 |
| f=3 | 256 | 257 | 258 | 259 | 260 | 261 | 262 | 263 | 264 | 265 | 266 | 267 | 268 | 269 | 270 | 271 |
| f=4 | 241 | 242 | 243 | 244 | 245 | 246 | 247 | 248 | 249 | 250 | 251 | 252 | 253 | 254 | 255 | 240 |
| f=5 | 226 | 227 | 228 | 229 | 230 | 231 | 232 | 233 | 234 | 235 | 236 | 237 | 238 | 239 | 224 | 225 |
| f=6 | 211 | 212 | 213 | 214 | 215 | 216 | 217 | 218 | 219 | 220 | 221 | 222 | 223 | 208 | 209 | 210 |
| f=7 | 196 | 197 | 198 | 199 | 200 | 201 | 202 | 203 | 204 | 205 | 206 | 207 | 192 | 193 | 194 | 195 |
| f=8 | 181 | 182 | 183 | 184 | 185 | 186 | 187 | 188 | 189 | 190 | 191 | 176 | 177 | 178 | 179 | 180 |
| f=9 | 166 | 167 | 168 | 169 | 170 | 171 | 172 | 173 | 174 | 175 | 160 | 161 | 162 | 163 | 164 | 165 |
| f=10 | 151 | 152 | 153 | 154 | 155 | 156 | 157 | 158 | 159 | 144 | 145 | 146 | 147 | 148 | 149 | 150 |
| f=11 | 136 | 137 | 138 | 139 | 140 | 141 | 142 | 143 | 128 | 129 | 130 | 131 | 132 | 133 | 134 | 135 |
| f=12 | 121 | 122 | 123 | 124 | 125 | 126 | 127 | 112 | 113 | 114 | 115 | 116 | 117 | 118 | 119 | 120 |
| f=13 | 106 | 107 | 108 | 109 | 110 | 111 | 96 | 97 | 98 | 99 | 100 | 101 | 102 | 103 | 104 | 105 |
| f=14 | 91 | 92 | 93 | 94 | 95 | 80 | 81 | 82 | 83 | 84 | 85 | 86 | 87 | 88 | 89 | 90 |
| f=15 | 76 | 77 | 78 | 79 | 64 | 65 | 66 | 67 | 68 | 69 | 70 | 71 | 72 | 73 | 74 | 75 |
| f=16 | 61 | 62 | 63 | 48 | 49 | 50 | 51 | 52 | 53 | 54 | 55 | 56 | 57 | 58 | 59 | 60 |
| f=17 | 46 | 47 | 32 | 33 | 34 | 35 | 36 | 37 | 38 | 39 | 40 | 41 | 42 | 43 | 44 | 45 |
| f=18 | 31 | 16 | 17 | 18 | 19 | 20 | 21 | 22 | 23 | 24 | 25 | 26 | 27 | 28 | 29 | 30 |
| f=19 | 0 | 1 | 2 | 3 | 4 | 5 | 6 | 7 | 8 | 9 | 10 | 11 | 12 | 13 | 14 | 15 |
| f=20 | | | | | | | | | | | | | | | | |
| f=21 | | | | | | | | | | | | | | | | |

| | t=32 | t=33 | t=34 | t=35 | t=36 | t=37 | t=38 | t=39 | t=40 | t=41 | t=42 | t=43 | t=44 | t=45 | t=46 | t=47 |
|---|---|---|---|---|---|---|---|---|---|---|---|---|---|---|---|---|
| f=0 | | | | | | | | | | | | | | | | |
| f=1 | | | | | | | | | | | | | | | | |
| f=2 | 0 | 1 | 2 | 3 | 4 | 5 | 6 | 7 | 8 | 9 | 10 | 11 | 12 | 13 | 14 | 15 |
| f=3 | 30 | 31 | 16 | 17 | 18 | 19 | 20 | 21 | 22 | 23 | 24 | 25 | 26 | 27 | 28 | 29 |
| f=4 | 44 | 45 | 46 | 47 | 32 | 33 | 34 | 35 | 36 | 37 | 38 | 39 | 40 | 41 | 42 | 43 |
| f=5 | 58 | 59 | 60 | 61 | 62 | 63 | 48 | 49 | 50 | 51 | 52 | 53 | 54 | 55 | 56 | 57 |
| f=6 | 72 | 73 | 74 | 75 | 76 | 77 | 78 | 79 | 64 | 65 | 66 | 67 | 68 | 69 | 70 | 71 |
| f=7 | 86 | 87 | 88 | 89 | 90 | 91 | 92 | 93 | 94 | 95 | 80 | 81 | 82 | 83 | 84 | 85 |
| f=8 | 100 | 101 | 102 | 103 | 104 | 105 | 106 | 107 | 108 | 109 | 110 | 111 | 96 | 97 | 98 | 99 |
| f=9 | 114 | 115 | 116 | 117 | 118 | 119 | 120 | 121 | 122 | 123 | 124 | 125 | 126 | 127 | 112 | 113 |
| f=10 | 128 | 129 | 130 | 131 | 132 | 133 | 134 | 135 | 136 | 137 | 138 | 139 | 140 | 141 | 142 | 143 |
| f=11 | 158 | 159 | 144 | 145 | 146 | 147 | 148 | 149 | 150 | 151 | 152 | 153 | 154 | 155 | 156 | 157 |
| f=12 | 172 | 173 | 174 | 175 | 160 | 161 | 162 | 163 | 164 | 165 | 166 | 167 | 168 | 169 | 170 | 171 |
| f=13 | 186 | 187 | 188 | 189 | 190 | 191 | 176 | 177 | 178 | 179 | 180 | 181 | 182 | 183 | 184 | 185 |
| f=14 | 200 | 201 | 202 | 203 | 204 | 205 | 206 | 207 | 192 | 193 | 194 | 195 | 196 | 197 | 198 | 199 |
| f=15 | 214 | 215 | 216 | 217 | 218 | 219 | 220 | 221 | 222 | 223 | 208 | 209 | 210 | 211 | 212 | 213 |
| f=16 | 228 | 229 | 230 | 231 | 232 | 233 | 234 | 235 | 236 | 237 | 238 | 239 | 224 | 225 | 226 | 227 |
| f=17 | 242 | 243 | 244 | 245 | 246 | 247 | 248 | 249 | 250 | 251 | 252 | 253 | 254 | 255 | 240 | 241 |
| f=18 | 256 | 257 | 258 | 259 | 260 | 261 | 262 | 263 | 264 | 265 | 266 | 267 | 268 | 269 | 270 | 271 |
| f=19 | 286 | 287 | 272 | 273 | 274 | 275 | 276 | 277 | 278 | 279 | 280 | 281 | 282 | 283 | 284 | 285 |
| f=20 | | | | | | | | | | | | | | | | |
| f=21 | | | | | | | | | | | | | | | | |

|      | t=48 | t=49 | t=50 | t=51 | t=52 | t=53 | t=54 | t=55 | t=56 | t=57 | t=58 | t=59 | t=60 | t=61 | t=62 | t=63 |
|------|------|------|------|------|------|------|------|------|------|------|------|------|------|------|------|------|
| f=0  |      |      |      |      |      |      |      |      |      |      |      |      |      |      |      |      |
| f=1  |      |      |      |      |      |      |      |      |      |      |      |      |      |      |      |      |
| f=2  | 285  | 286  | 287  | 272  | 273  | 274  | 275  | 276  | 277  | 278  | 279  | 280  | 281  | 282  | 283  | 284  |
| f=3  | 256  | 257  | 258  | 259  | 260  | 261  | 262  | 263  | 264  | 265  | 266  | 267  | 268  | 269  | 270  | 271  |
| f=4  | 243  | 244  | 245  | 246  | 247  | 248  | 249  | 250  | 251  | 252  | 253  | 254  | 255  | 240  | 241  | 242  |
| f=5  | 230  | 231  | 232  | 233  | 234  | 235  | 236  | 237  | 238  | 239  | 224  | 225  | 226  | 227  | 228  | 229  |
| f=6  | 217  | 218  | 219  | 220  | 221  | 222  | 223  | 208  | 209  | 210  | 211  | 212  | 213  | 214  | 215  | 216  |
| f=7  | 204  | 205  | 206  | 207  | 192  | 193  | 194  | 195  | 196  | 197  | 198  | 199  | 200  | 201  | 202  | 203  |
| f=8  | 191  | 176  | 177  | 178  | 179  | 180  | 181  | 182  | 183  | 184  | 185  | 186  | 187  | 188  | 189  | 190  |
| f=9  | 162  | 163  | 164  | 165  | 166  | 167  | 168  | 169  | 170  | 171  | 172  | 173  | 174  | 175  | 160  | 161  |
| f=10 | 149  | 150  | 151  | 152  | 153  | 154  | 155  | 156  | 157  | 158  | 159  | 144  | 145  | 146  | 147  | 148  |
| f=11 | 136  | 137  | 138  | 139  | 140  | 141  | 142  | 143  | 128  | 129  | 130  | 131  | 132  | 133  | 134  | 135  |
| f=12 | 123  | 124  | 125  | 126  | 127  | 112  | 113  | 114  | 115  | 116  | 117  | 118  | 119  | 120  | 121  | 122  |
| f=13 | 110  | 111  | 96   | 97   | 98   | 99   | 100  | 101  | 102  | 103  | 104  | 105  | 106  | 107  | 108  | 109  |
| f=14 | 81   | 82   | 83   | 84   | 85   | 86   | 87   | 88   | 89   | 90   | 91   | 92   | 93   | 94   | 95   | 80   |
| f=15 | 68   | 69   | 70   | 71   | 72   | 73   | 74   | 75   | 76   | 77   | 78   | 79   | 64   | 65   | 66   | 67   |
| f=16 | 55   | 56   | 57   | 58   | 59   | 60   | 61   | 62   | 63   | 48   | 49   | 50   | 51   | 52   | 53   | 54   |
| f=17 | 42   | 43   | 44   | 45   | 46   | 47   | 32   | 33   | 34   | 35   | 36   | 37   | 38   | 39   | 40   | 41   |
| f=18 | 29   | 30   | 31   | 16   | 17   | 18   | 19   | 20   | 21   | 22   | 23   | 24   | 25   | 26   | 27   | 28   |
| f=19 | 0    | 1    | 2    | 3    | 4    | 5    | 6    | 7    | 8    | 9    | 10   | 11   | 12   | 13   | 14   | 15   |
| f=20 |      |      |      |      |      |      |      |      |      |      |      |      |      |      |      |      |
| f=21 |      |      |      |      |      |      |      |      |      |      |      |      |      |      |      |      |

RESOURCE PATTERNS FOR DISCOVERY

RELATED APPLICATIONS

This application claims the benefit of U.S. Provisional Application No. 62/007,453, filed Jun. 4, 2014, the disclosure of which is fully incorporated herein by reference.

TECHNICAL FIELD

This disclosure pertains to resource patterns for discovery, and more particularly to resource patterns for Device-to-Device (D2D) discovery.

BACKGROUND

Device-to-Device (D2D) communication is used in wireless technologies, including ad hoc and cellular networks. Examples of D2D communication include Bluetooth and several variants of the IEEE 802.11 standards suite, such as WiFi Direct. These systems operate in an unlicensed spectrum.

Recently, D2D communications as an underlay to cellular networks have been proposed as a way to take advantage of the proximity of communicating devices and at the same time to allow devices to operate in a controlled interference environment. This is referred to as network-assisted D2D communication. Typically, it is suggested that such D2D communication shares the same spectrum as the cellular system, for example by reserving some of the cellular uplink resources for D2D purposes. Allocating dedicated spectrum for D2D purposes is a less likely alternative as spectrum is a scarce resource and (dynamic) sharing between the D2D services and cellular services is more flexible and provides higher spectrum efficiency.

Devices that want to communicate, or even just discover each other, typically need to transmit various forms of control signaling. One example of such control signaling is the so-called discovery signal (which may possibly include a full message), which at least carries some form of identity and is transmitted by a device that wants to be discoverable by other devices. Other devices can scan for the discovery signals. Once they have detected the discovery signal, they can take the appropriate action, for example to try to initiate a connection setup with the device transmitting the discovery message.

Multiple discovery signals from different User Equipment devices (UEs) are multiplexed on the same radio resources in a combination of Time Division Multiplexing (TDM), Frequency Division Multiplexing (FDM), and possibly Code Division Multiplexing (CDM). In the Third Generation Partnership Project (3GPP), the details for the D2D discovery signals have not yet been agreed upon. However, it is likely that D2D discovery signals will be multiplexed on specific subframes (referred to as a "discovery period") occurring at known (or signaled) positions in the radio frame (e.g., every 10 seconds). Similarly to the D2D discovery signals, it is envisioned that UEs will transmit channels for data and/or control information.

Within a discovery period, resources (time, frequency, and possibly code resources) for transmission of data and control channels (including discovery) may be assigned by a controlling node or be defined according to pre-configured patterns. In general, each channel from each UE occupies a subset of the time/frequency and possibly code resources in the system.

For certain resource allocation mechanisms (e.g., Type 2 discovery and mode 1 communication in 3GPP Long Term Evolution (LTE)), the D2D resources are assigned by the network according to predefined resource patterns. A number of resource patterns have been proposed for D2D, mainly for discovery. However, such patterns produce fragmentation of the cellular radio resources and are not suitable for multiplexing with cellular signals in a FDM fashion. Furthermore, these patterns may occur in mutual collisions even within the area controlled by the same scheduler.

SUMMARY

Systems and methods are disclosed herein that relate to assigning Device-to-Device (D2D) resource patterns to wireless devices, or User Equipment devices (UEs), and using the assigned D2D resource patterns. In some embodiments, a wireless device having cellular network assisted D2D communication capabilities is operable to transmit a D2D signal in a frequency band of a cellular network during a predefined D2D period according to one of a plurality of predefined D2D transmission patterns. The plurality of predefined D2D transmission patterns has at least one of (i.e., one or more of) the following properties: (a) a cell-specific circular shift; (b) the predefined D2D period comprising N time resources and F frequency resources defining a total of N×F D2D resources divided into M clusters each comprising K=N/M time resources, and each of the plurality of predefined D2D transmission patterns comprising at most one D2D resource in each of the M clusters, where M>1; (c) the predefined D2D period comprising N time resources and F frequency resources defining a total of N×F D2D resources divided into M clusters each comprising K=N/M time resources, and the plurality of predefined D2D transmission patterns being assigned to each of the M clusters in a time-first fashion starting with frequency resources at either a lowest or highest available frequency for D2D communication in the frequency band of the cellular network; (d) the predefined D2D period comprising N time resources and F frequency resources defining a total of N×F D2D resources divided into M clusters each comprising K=N/M time resources, and, for at least one of the plurality of predefined D2D transmission patterns, a relative mapping between a pattern index for the at least one of the plurality of predefined D2D transmission patterns and time resources within a cluster is different for different clusters and/or different frequency resources; and (e) each pattern of the plurality of predefined D2D transmission patterns spans two frequency resources within the predefined D2D period.

In some embodiments, the plurality of predefined D2D transmission patterns have a cell-specific circular shift. Further, in some embodiments, each pattern of the plurality of predefined D2D transmission patterns spans two frequency resources within the predefined D2D period.

In some embodiments, the predefined D2D period comprises N time resources and F frequency resources defining a total of N×F D2D resources divided into M clusters each comprising K=N/M time resources where M>1, and each of the plurality of predefined D2D transmission patterns comprises at most one D2D resource in each of the M clusters.

In some embodiments, the predefined D2D period comprises N time resources and F frequency resources defining a total of N×F D2D resources divided into M clusters each comprising K=N/M time resources, and the plurality of predefined D2D transmission patterns are assigned to each of the M clusters in a time-first fashion starting with frequency resources at either a lowest or highest available frequency for D2D communication in the frequency band of the cellular network.

In some embodiments, the predefined D2D period comprises N time resources and F frequency resources defining a total of N×F D2D resources divided into M clusters each comprising K=N/M time resources, and, for at least one of the plurality of predefined D2D transmission patterns, a relative mapping between a pattern index for the at least one of the plurality of predefined D2D transmission patterns and time resources within a cluster is different for different clusters and/or different frequency resources.

In some embodiments, each pattern of the plurality of predefined D2D transmission patterns spans two frequency resources within the predefined D2D period.

In some embodiments, the wireless device is further operable to receive a pattern index from a base station of the cellular network, the pattern index being an index for the one of the plurality of predefined D2D transmission patterns assigned to the wireless device. Further, in some embodiments, the pattern index is a resource allocation that is valid for multiple predefined D2D periods and the wireless device is further operable to re-assign the pattern index to a different one of the plurality of predefined D2D transmission patterns for a subsequent predefined D2D period and transmit a D2D signal in the frequency band of the cellular network during the subsequent predefined D2D period according to the different one of the plurality of predefined D2D transmission patterns. Further, in some embodiments, the pattern index is re-assigned to the different one of the plurality of predefined D2D transmission patterns based on at least one of a group consisting of: the pattern index, one or more time-related parameters, a cell identifier of a serving cell of the wireless device, a Public Land Mobile Network (PLMN) identifier of the cellular network, and a carrier frequency of the frequency band of the cellular network.

In some embodiments, the frequency band of the cellular network is an uplink frequency band of the cellular network.

In some embodiments, the predefined D2D period is a predefined D2D discovery period comprising a plurality of subframes.

In some other embodiments, a wireless device having cellular network assisted D2D communication capabilities is operable to receive a D2D signal from another wireless device in a frequency band of a cellular network during a predefined D2D period according to one of a plurality of predefined D2D transmission patterns assigned to the other wireless device. The plurality of predefined D2D transmission patterns having at least one of the following properties: (a) a cell-specific circular shift; (b) the predefined D2D period comprising N time resources and F frequency resources defining a total of N×F D2D resources divided into M clusters each comprising K=N/M time resources, and each of the plurality of predefined D2D transmission patterns comprising at most one D2D resource in each of the M clusters, where M>1; (c) the predefined D2D period comprising N time resources and F frequency resources defining a total of N×F D2D resources divided into M clusters each comprising K=N/M time resources, and the plurality of predefined D2D transmission patterns being assigned to each of the M clusters in a time-first fashion starting with frequency resources at either a lowest or highest available frequency for D2D communication in the frequency band of the cellular network; (d) the predefined D2D period comprising N time resources and F frequency resources defining a total of N×F D2D resources divided into M clusters each comprising K=N/M time resources, and, for at least one of the plurality of predefined D2D transmission patterns, a relative mapping between a pattern index for the at least one of the plurality of predefined D2D transmission patterns and time resources within a cluster is different for different clusters and/or different frequency resources; and (e) each pattern of the plurality of predefined D2D transmission patterns spans two frequency resources within the predefined D2D period.

Embodiments of a method of operation of a wireless device having cellular network assisted D2D communication capabilities are also disclosed.

Embodiments of a method of operation of a network node of a cellular communications network are also disclosed. In some embodiments, the method of operation of a network node comprises assigning a pattern index to a wireless device, the pattern index being an index of one of a plurality of predefined D2D transmission patterns for transmission of a D2D discovery signal within a frequency band of the cellular communications network during a predefined D2D period. The plurality of predefined D2D transmission patterns have at least one of the following properties: (a) a cell-specific circular shift; (b) the predefined D2D period comprising N time resources and F frequency resources defining a total of N×F D2D resources divided into M clusters each comprising K=N/M time resources, and each of the plurality of predefined D2D transmission patterns comprising at most one D2D resource in each of the M clusters, where M>1; (c) the predefined D2D period comprising N time resources and F frequency resources defining a total of N×F D2D resources divided into M clusters each comprising K=N/M time resources, and the plurality of predefined D2D transmission patterns being assigned to each of the M clusters in a time-first fashion starting with frequency resources at either a lowest or highest available frequency for D2D communication in the frequency band of the cellular communications network; (d) the predefined D2D period comprising N time resources and F frequency resources defining a total of N×F D2D resources divided into M clusters each comprising K=N/M time resources, and, for at least one of the plurality of predefined D2D transmission patterns, a relative mapping between the pattern index for the at least one of the plurality of predefined D2D transmission patterns and time resources within a cluster is different for different clusters and/or different frequency resources; and (e) each pattern of the plurality of predefined D2D transmission patterns spans two frequency resources within the predefined D2D period. The method of operation of the network node further comprises transmitting the pattern index to the wireless device.

In some embodiments, the predefined D2D period comprises N time resources and F frequency resources defining a total of N×F D2D resources divided into M clusters each comprising K=N/M time resources, the plurality of predefined D2D transmission patterns are assigned to each of the M clusters in a time-first fashion starting with frequency resources at either a lowest or highest available frequency for D2D communication in the frequency band of the cellular communications network, pattern indices are mapped to the plurality of predefined D2D transmission patterns in the order in which the plurality of predefined D2D transmission patterns are assigned to each of the M clusters in the time-first fashion starting with a lowest pattern index, and assigning the pattern index to the wireless device comprises assigning a lowest available pattern index to the wireless device.

In some embodiments, the frequency band of the cellular communications network is an uplink frequency band of the cellular communications network.

In some embodiments, the predefined D2D period is a predefined D2D discovery period comprising a plurality of subframes.

Embodiments of a network node are also disclosed.

Those skilled in the art will appreciate the scope of the present disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 8A, 8B and 8C illustrate one example in which resource patterns are subject to a circular time shift according to some cell-specific parameter according to some embodiments of the present disclosure;

FIGS. 10A through 10D illustrate example pattern index to resource mappings for the pool of FIG. 9 according to some embodiments of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein, it should be understood that these concepts and applications fall within the scope of the disclosure and the accompanying claims.

Systems and methods are disclosed herein for assigning Device-to-Device (D2D) resource patterns to wireless devices, or User Equipment devices (UEs), and using the assigned D2D resource patterns. As used herein, a resource pattern defines resources (time, frequency, and possibly code resources) for transmission of a D2D signal (e.g., a D2D discovery signal) by a wireless device in a frequency band (e.g., an uplink frequency band) of a wireless communications network (e.g., a cellular network) during a period of time reserved for D2D communication (e.g., during a D2D discovery period). Notably, while many of the embodiments described herein are D2D discovery, the present disclosure is not limited thereto. The concepts disclosed herein can be used for any suitable type of D2D transmission. Thus, it should be understood that where the embodiments described herein refer to, e.g., a D2D discovery signal or a D2D discovery resource pattern, those embodiments can be extended to cover other types of D2D communication.

Embodiments disclosed herein provide for a definition of deterministic time/frequency patterns characterized by specific construction properties that result in fulfillment of certain design goals, such as maximum interference randomization and minimum fragmentation of the cellular spectrum. Solutions for scheduling and inter-cell resource allocation are also provided.

Figure 1:
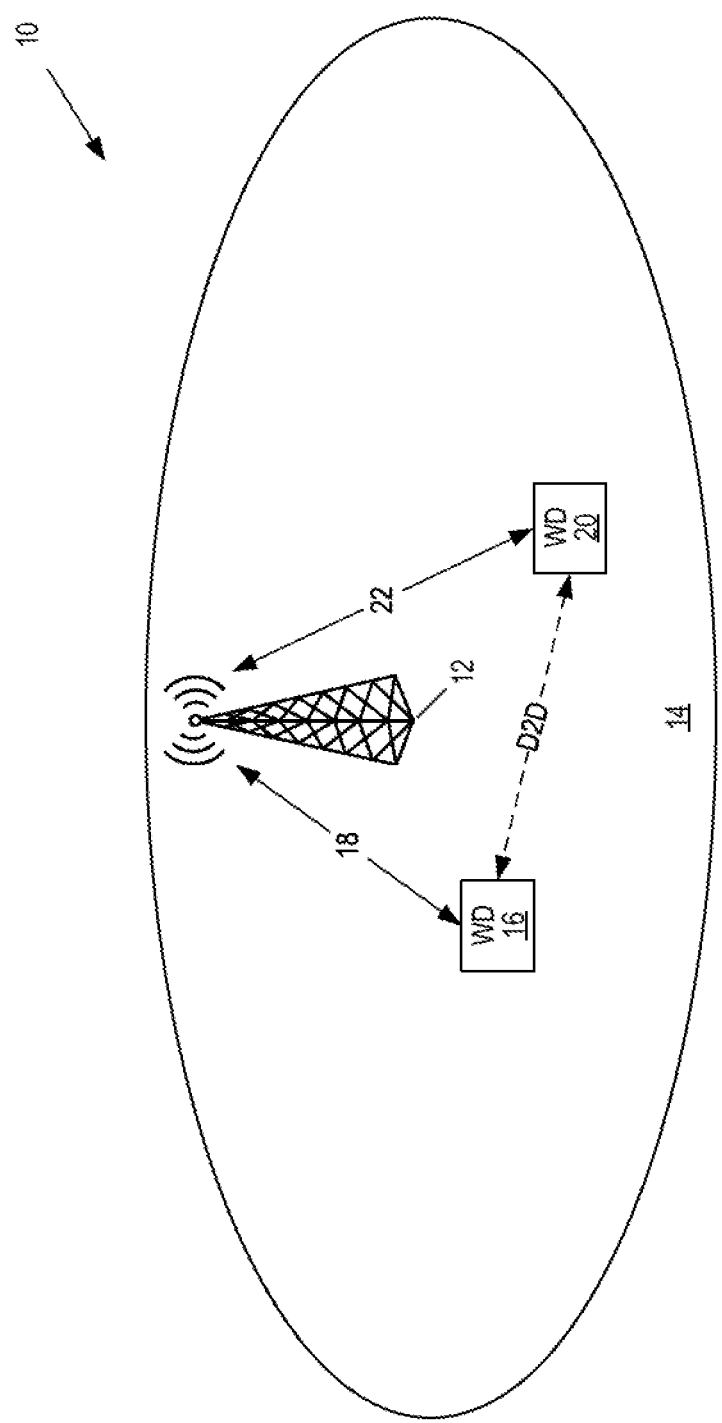
FIG. 1 is a schematic block diagram of a wireless communications network in accordance with embodiments of the present disclosure.

In this regard, FIG. 1 is a schematic block diagram of a wireless communications network 10 in accordance with embodiments of the present disclosure. The wireless communications network 10 may be a cellular communications network such as a Long Term Evolution (LTE) network, a Wideband Code Division Multiple Access (WCDMA) network, a Global System for Mobile communications (GSM) network, any Third Generation Partnership Project (3GPP) cellular network, or any cellular network or system. The wireless communications network 10 may also be a non-3GPP cellular network, such as a Worldwide Interoperability for Microwave Access (WiMax) network, or an infrastructure based Wireless Local Area Network (WLAN). A radio access network and possibly one or more core networks used in embodiments herein are comprised within the wireless communications network 10.

The wireless communications network 10 comprises a radio base station 12. The radio base station 12 serves a cell 14 and may in some embodiments be part of the radio access network. The radio base station 12 may, e.g., be an enhanced or evolved Node B (eNB) or a Home Node B, a Home eNB, or any other network unit capable to serve a wireless device (e.g., a UE or a machine type communication device) in the wireless communications network 10.

A first wireless device 16 is located within the cell 14. The first wireless device 16 is configured to communicate within the cellular communications network 10 via the radio base station 12 over a radio link 18 when the first wireless device 16 is present in the cell 14 served by the radio base station 12. The first wireless device 16 has capabilities to communicate with another device, such as another wireless device, over a direct device to device connection (i.e., a direct D2D connection). A direct device to device connection means that the communication, i.e. transmission and reception of signals and encoding and decoding information, is performed without passing, i.e. not via any radio base station or intermediate node. The direct device to device connection is referred to as a direct D2D connection herein. It may also be referred to as a peer-to-peer connection. A first Internet Protocol (IP) address is in some embodiments herein assigned to the first wireless device 16.

A second wireless device 20 is also located within the cell 14. The second wireless device 20 is configured to communicate within the cellular communications network 10 via the radio base station 12 over a radio link 22 when the second wireless device 20 is present in the cell 14 served by the radio base station 12. The second wireless device 20 has capabilities to communicate with another device, such as another wireless device, over a direct D2D connection. This may be referred to as a peer to peer connection or direct D2D connection. A second IP address is assigned to the wireless device 20.

The first wireless device 16 and the second wireless device 20 can communicate with each other via the radio base station 12, i.e. they are transmitting and receiving data packets to and from each other via the radio base station 12. In some instances, the first wireless device 16 and the second wireless device 20 can communicate with each other directly (i.e., via D2D communications), with or without signaling support from the radio base station 12.

The first wireless device 16 and the second wireless device 20 may, e.g., be mobile terminals or wireless terminals, mobile phones, computers such as, e.g., a laptop, Personal Digital Assistant (PDA) or tablet computers, sometimes referred to as surf plates, with wireless capability, or any other radio network unit capable to communicate over a radio link in a wireless communications system.

It is beneficial that resource patterns for transmission of direct channels between wireless devices, such as the first and second wireless devices 16 and 20, are commonly known by both the transmitter (i.e., the wireless device that is transmitting) and the receiver (i.e., the wireless device that is receiving) prior to the actual transmission. This knowledge allows the receiver to be able to perform soft combination of the (re)transmissions of the same packet, among other advantages.

Figure 2:
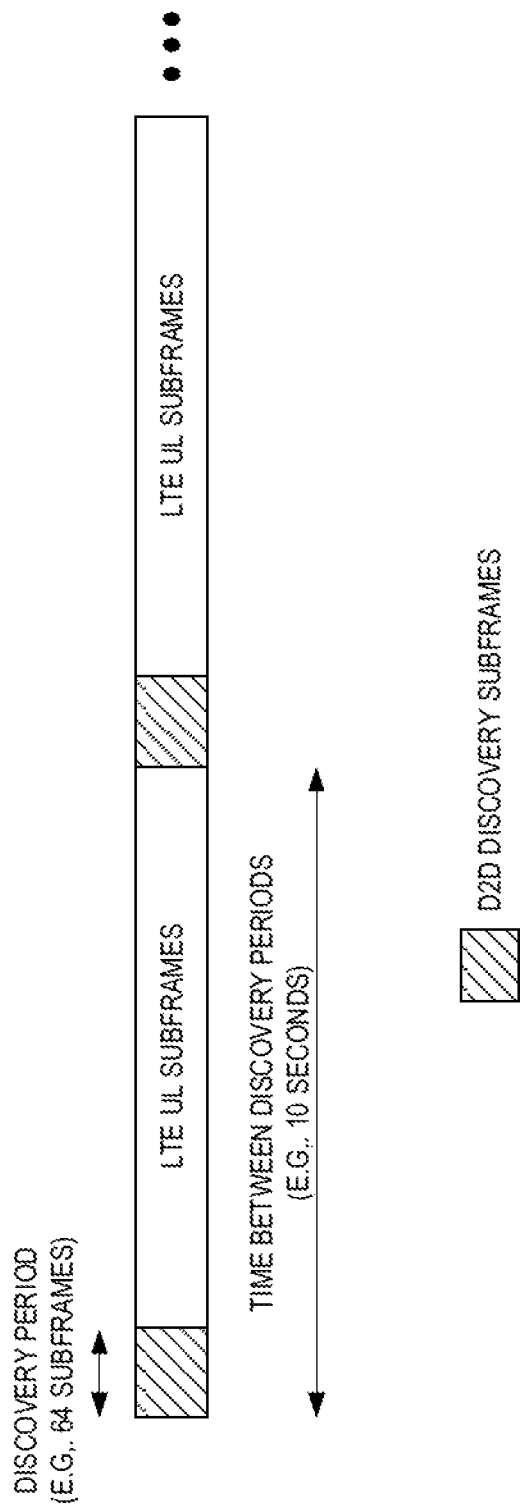
FIG. 2 illustrates one example of discovery periods within an uplink frequency band.

In the case of discovery (similar considerations apply even to any other direct channel), a discovery period is defined, which could span several seconds. A number of time resources (e.g., subframes) are allocated to discovery signal transmissions and/or reception within each cell. One example of discovery periods within the uplink frequency band of an LTE network is illustrated in FIG. 2. As illustrated, the discovery periods occur at predefined locations within the uplink frame structure (e.g., once every 10 seconds). Each discovery period includes a number of subframes (e.g., 64 subframes).

Figure 3:
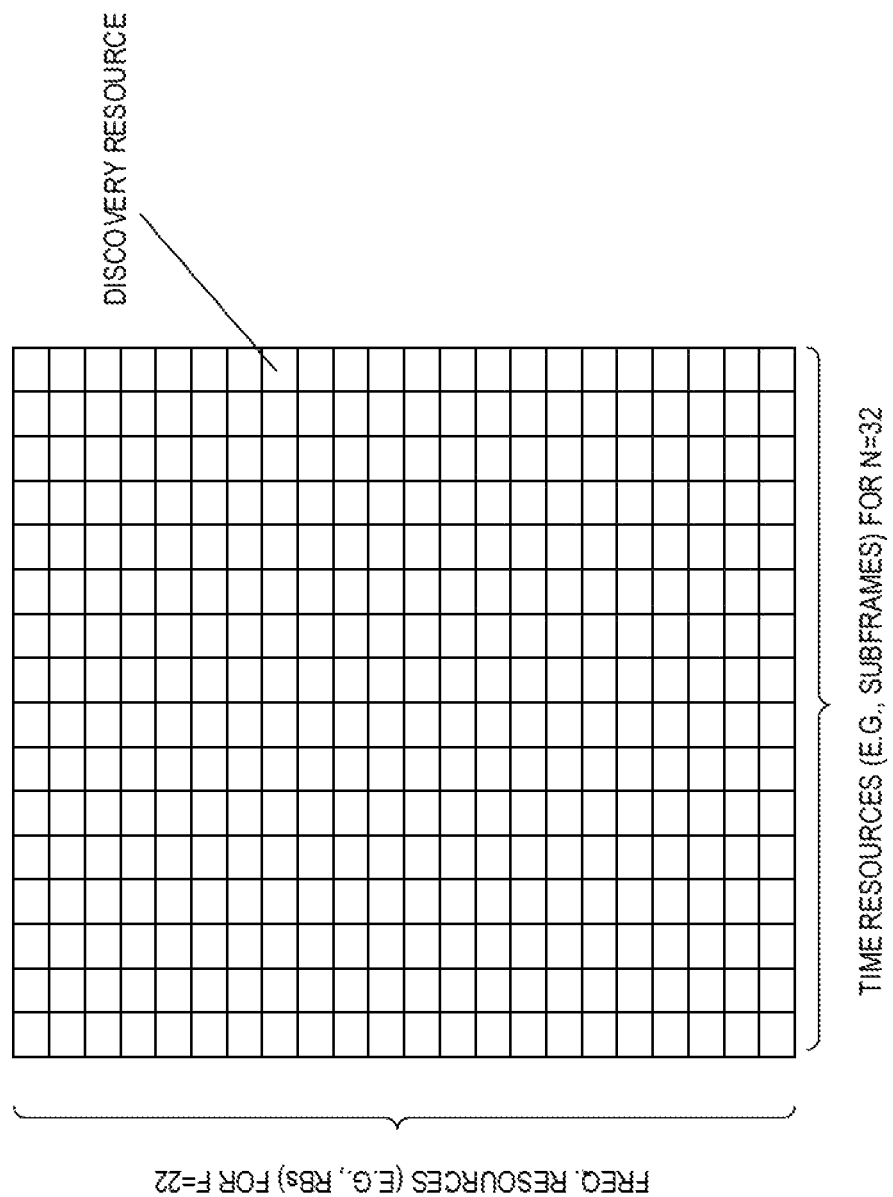
FIG. 3 illustrates one example of discovery resources within a discovery period.

Each discovery period includes many discovery resources, as illustrated in FIG. 3. As illustrated, the discovery period includes a number (N) of time resources (e.g., subframes) and a number (F) of frequency resources (e.g., Resource Blocks (RBs)). In the example of FIG. 3, N=32 and F=22. Wireless device specific resource patterns are used to define the time, frequency, and potentially (i.e., optionally) code resources for transmission of D2D signals. With respect to discovery, the wireless device specific resource pattern assigned to, e.g., the first wireless device 16 defines the time, frequency, and potentially code resources within a discovery period to be used by the first wireless device 16 for transmission of a D2D discovery signal with the discovery period. The wireless device specific resource patterns are only allowed to span a subset of the resources allocated for discovery within a cell.

In some instances, the patterns may even include implicit information regarding (re)transmission parameters, such as redundancy versions. For example, a pattern provides a number of L1 (re)transmissions of, e.g., the same Medium Access Control (MAC) payload on different time/frequency resources. Each of such resources may be associated to a predefined redundancy version or other coding details, according to a rule or a table.

Figure 4:
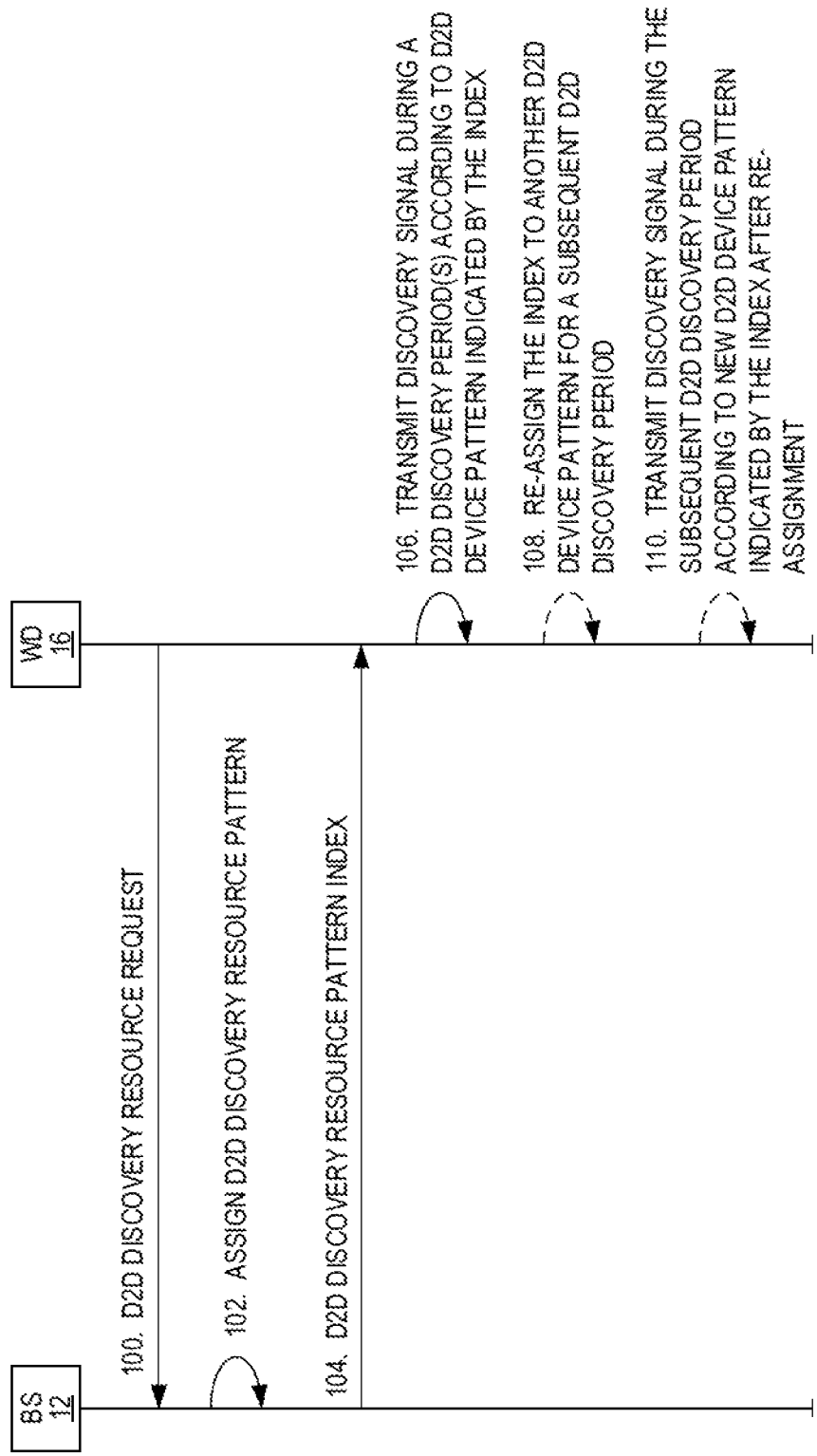
FIG. 4 illustrates the operation of the base station and the wireless device of FIG. 1 according to some embodiments of the present disclosure.

Before describing the design of the resource patterns, FIG. 4 illustrates the operation of the radio base station 12 and the first wireless device 16 according to some embodiments of the present disclosure. Notably, FIG. 4 focuses on D2D discovery; however, the process may be used for resource assignment for other types of D2D channels/communication. As illustrated, the first wireless device 16 sends a D2D discovery resource request to the radio base station 12 (step 100). In response, the radio base station 12 assigns a D2D discovery resource pattern to the first wireless device 16 (step 102). Again, the resource pattern defines the time, frequency, and potentially code resources within a discovery period to be used by the first wireless device 16 for transmission of a D2D discovery signal. The radio base station 12 then transmits an index to the first wireless device 16 that is indicative of (e.g., mapped to) the resource pattern assigned to the first wireless device 16 (step 104). The first wireless device 16 transmits a discovery signal during a D2D discovery period(s) according to the resource pattern indicated by the index received from the radio base station 12 (step 106). In other words, the first wireless device 16 transmits the discovery signal during the D2D discovery period(s) using the resources defined by the resource pattern indicated by the received pattern index.

As discussed below, in some embodiments, the assignment of the pattern index (i.e., a resource assignment) may be valid for multiple discovery periods and, in order to provide additional randomization, the first wireless device 16 may re-assign the pattern index to a new resource pattern for a subsequent discovery period (step 108). The first wireless device 16 then transmits a D2D discovery signal during the subsequent discovery period according to the new resource pattern indicated by the pattern index after re-assignment (step 110). As indicated by the dashed lines, steps 108 and 110 are optional (i.e., not included in all embodiments).

Designing efficient resource patterns is challenging in a number of ways. Embodiments of the present disclosure are directed to defining resource patterns that have at least the following features:
  Interference within a subframe should be randomized, in order to cope with inband emissions, near-far problems, and Automatic Gain Control (AGC) limitations;
  Cellular spectrum fractioning should be minimized;
  Frequency and time diversity should be maximized; and
  Intra/inter-cell collisions should be avoided or at least minimized.

In the following, a number of design principles for the patterns that allow achieving at least some of the goals above are described. Example patterns that fulfill all the provided principles are also provided. However, other patterns that only fulfill only some of the principles described in the following should also be considered as part of the present disclosure.

Figure 5:
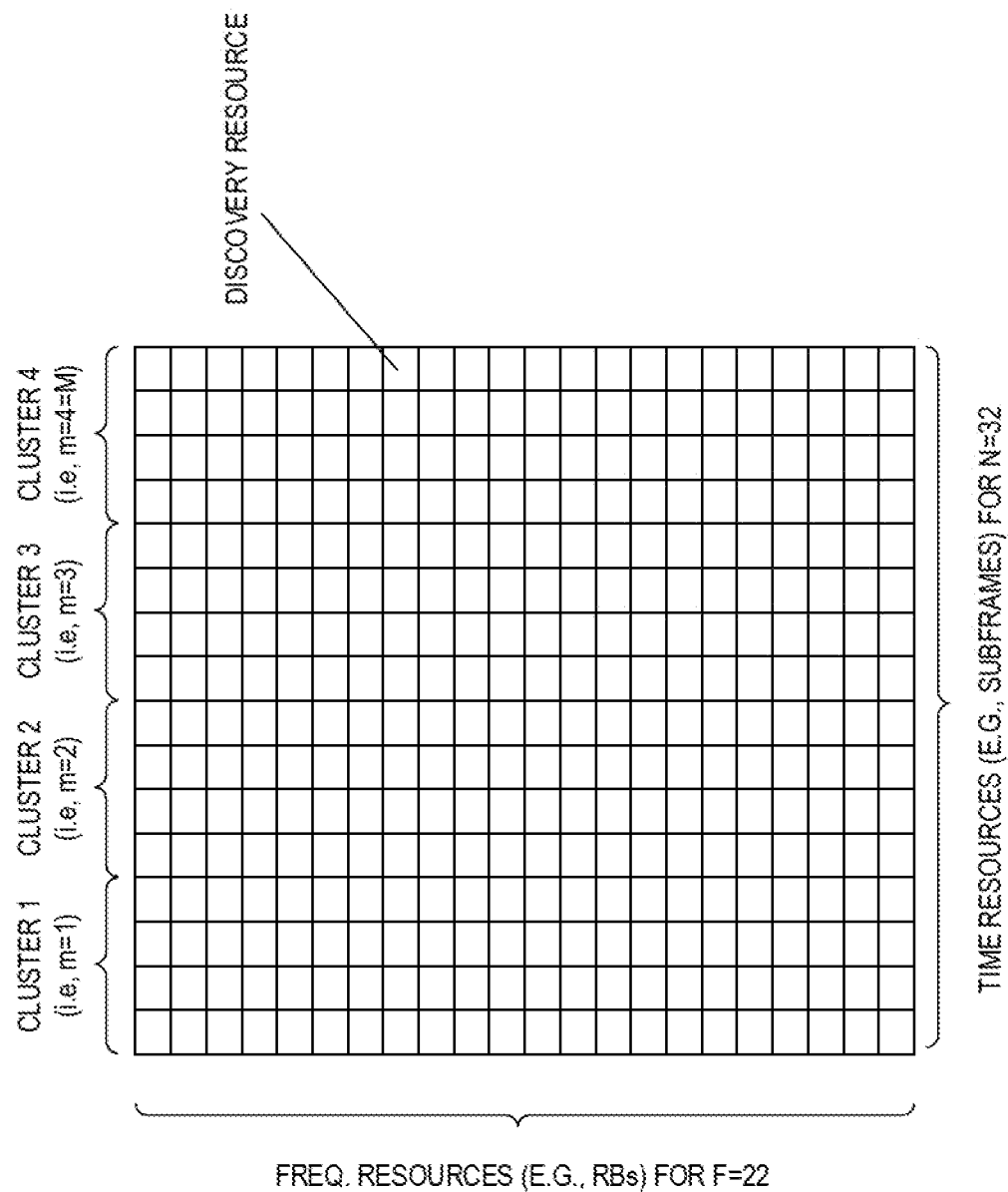
FIG. 5 illustrates an example of discovery resources within a discovery period where the discovery resources are divided into clusters according to some embodiments of the present disclosure.
Figure 6:
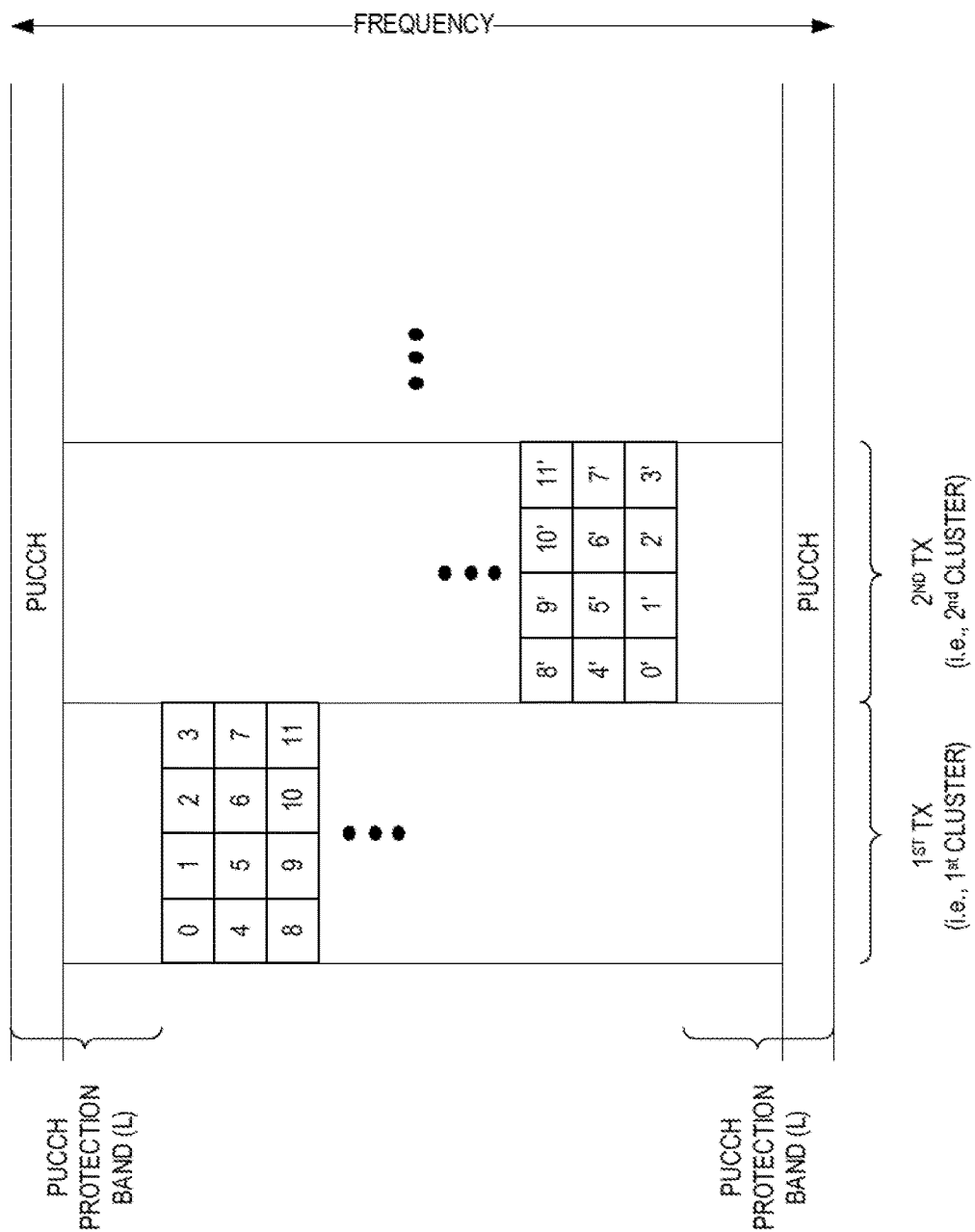
FIG. 6 illustrates an example of a resource pattern property where each resource pattern within a discovery period assigns at most one (re)transmission of a certain signal in each cluster according to some embodiments of the present disclosure.
Figure 7:
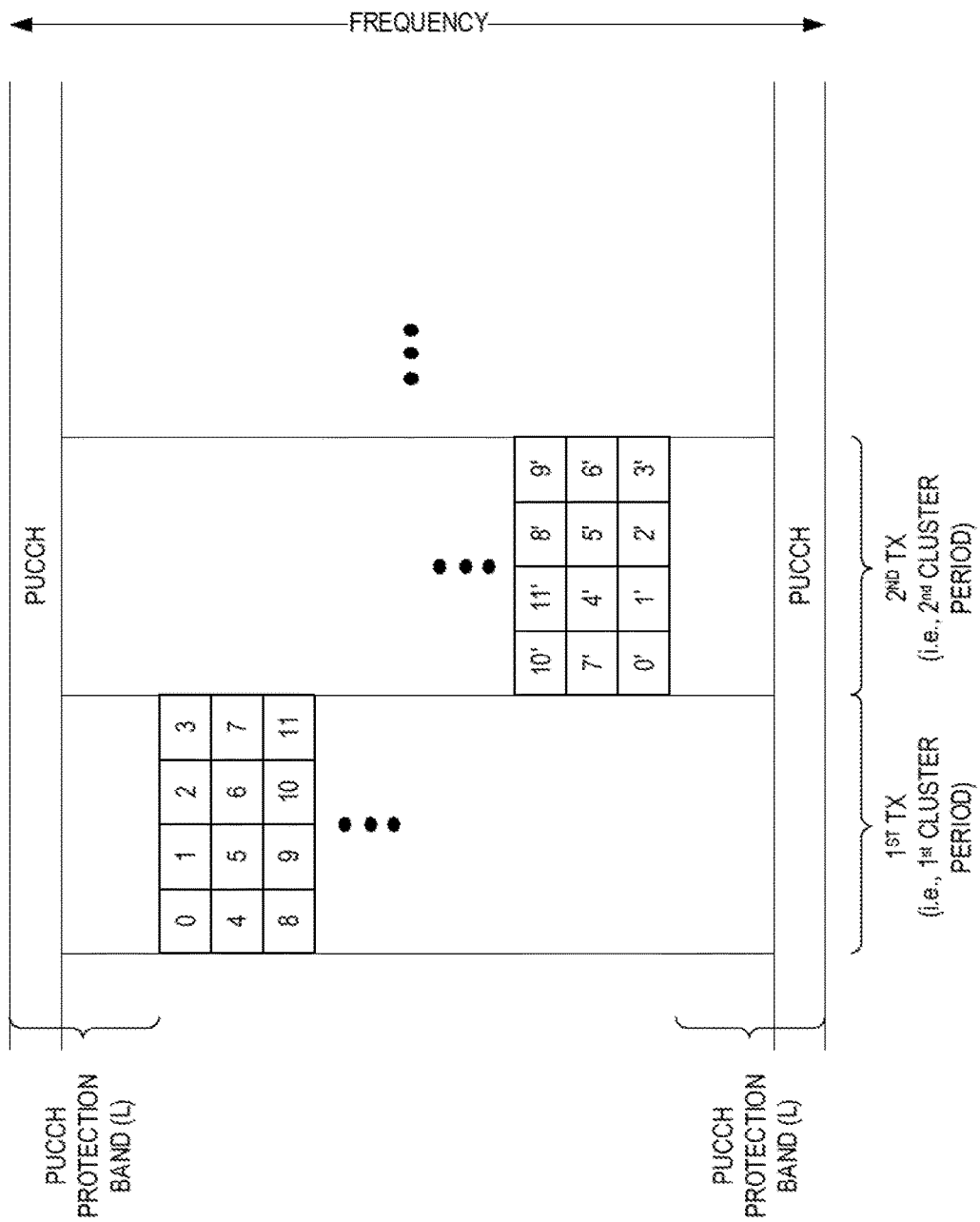
FIG. 7 illustrates an example of a resource pattern property where a relative mapping between pattern index and time resources within a cluster is different for different clusters and/or different frequencies according to some embodiments of the present disclosure.

In some embodiments, a transmitting wireless device (e.g., the first wireless device 16) in a D2D communications scheme can transmit a D2D signal using a resource allocation pattern that includes one or more properties. In some embodiments, the properties include one or a combination of the following:

1. Index re-assignment between discovery periods (e.g., as illustrated in FIG. 4): For certain resource allocation protocols (e.g., discovery type 2b), a scheduler of the radio base station 12 assigns a resource pattern to the first wireless device 16 that is valid for a longer time, possibly spanning several discovery periods. In order to randomize interference between discovery periods and/or between cells and/or carriers, the mapping from the pattern index to the actual resource patterns may be re-assigned at each discovery period based, e.g., on some predefined rule or a table. Possibly, the re-assignment rule may be a function of the pattern index, some notion of time or time-related parameter(s), and possibly other parameters such as the cell Identifier (ID), the Public Land Mobile Network (PLMN) ID of the wireless communications network 10, or the carrier frequency. In some instances of the embodiments of the present disclosure, even without periodic re-assignment, the sets of patterns used in each cell and/or carrier are specific for that cell and/or carrier. That is, the set of patterns used for a particular cell are a subset of all available patterns based on a partitioning rule.
2. In case that resource patterns provide M>1 transmission resources for (re)transmission of a discovery signal (e.g., (re)transmission of a MAC payload) within a discovery period, the N cell specific resources in time are clustered into M resource clusters in time. Each cluster includes K=N/M time resources. One example of the discovery resources within a discovery period having F=22 frequency resources, N=32 time resources, and M=4 clusters is illustrated in FIG. 5. Each pattern assigns at most one (re)transmission of a certain signal (e.g., MAC Protocol Data Unit (PDU)) in each cluster. One example of this property is illustrated in FIG. 6, where each pattern (i.e., patterns 0, 1, 2, etc.) includes one discovery resource for a (re)transmission within each cluster. If all patterns have the same value of M, then all patterns assign exactly one resource for each cluster. Note that the clusters may be contiguous in time (as illustrated in FIGS. 5 and 6) or interleaved with each other. By doing so, time diversity is guaranteed for each pattern.
3. Patterns are assigned to each cluster in a time-first fashion. For example, if K=4, the first transmissions of the first 4 patterns are progressively mapped to the K time resources of the first cluster for the first available frequency resource. The following 4 first transmissions of the next 4 patterns are progressively mapped to the K time resources of the first cluster for the second available frequency resource, and so on. Note that the frequency resources may be equivalently counted started from the lowest or highest available frequencies for D2D within the carrier. This allows orthogonality between patterns within a certain cell. This also allows minimum spectrum fragmentation because the patterns span only frequencies close to carrier edges. The example patterns of FIG. 6 also illustrate this property. As illustrated in FIG. 6, the first transmissions of patterns 0, 1, 2, and 3 are progressively mapped to the K=4 time resources of the first cluster for the first available frequency resource, which in this example is the highest available resource after leaving a Physical Uplink Control Channel (PUCCH) protection band of L frequency resources. The first transmission of patterns 4, 5, 6, and 7 are progressively mapped to the K=4 time resources of the first cluster for the second available frequency resource, and so on.
4. The relative mapping between pattern index and time resources within a cluster is different for different clusters and/or different frequencies. For example, the exact mapping from pattern index to time resources within a cluster may be a function of the cluster index and/or frequency resource for the pattern in that cluster. In some instances of the embodiments, the time resources used for a certain pattern in a certain cluster and frequency resource may be circularly shifted within the set of time resources in the cluster, where the shift is a function of the cluster index and/or the pattern index and/or the frequency resource. Circular shift is just an example; other mappings are possible as a function of at least the cluster index and/or the pattern index and/or the frequency resource. One example of this property is illustrated in FIG. 7 where the relative mapping between pattern index and time resources within a cluster is different for different clusters and/or different frequency resources. For instance, the resource pattern 4 (which for this example is assumed to have a pattern index of 0) is mapped to the first time resource in the first cluster and to the second time resource in the second cluster.
5. Each pattern only spans two possible frequency resources. Such frequency resources may be symmetrical within the carrier. This property allows minimization of spectrum fragmentation. The example patterns of FIGS. 6 and 7 both illustrate this property. For instance, pattern 0 spans only two frequency resources, pattern 1 only spans two frequency resources, and so on.
6. One or multiple shorter patterns (with small M) may be derived from longer patterns (with larger M) by selecting subsets of the resources spanned by the longer pattern based on predefined rules or tables.

Notably, FIGS. 6 and 7 are schematic diagrams of resource allocation patterns in accordance with embodiments of the present disclosure. The number in each box indicates the pattern index p and, in FIGS. 6 and 7, the "prime" indicates the (re)transmission index (m). FIG. 7 reflects properties 1-6 and 8.

A receiving wireless device (e.g., the second wireless device 20) can receive a signal transmitted by a transmitting wireless device (e.g., the first wireless device 16) according to a resource pattern having the above properties and exploit such properties, e.g., in the combination of multiple (re) transmissions of the signal on the multiple resources defined by the resource pattern. The specific pattern used for transmission and, thus, the specific pattern to be received may or may not be known by the receiver prior to actual reception of the pattern. In case the pattern is not previously known, the receiver attempts blind detection of a D2D signal based on the resources for at least one of the possible patterns used for signal transmission. The receiving wireless device can combine the resources in the demodulator or other receiver processing according to the predefined patterns.

One or more control nodes (e.g., an eNB or a control wireless device) may define one or more resource allocation patterns that are specific for the controlled wireless devices (e.g., D2D transmitters and/or receivers) and that include the above properties, but also fulfill one or more of the following properties. The transmitting and/or receiving wireless devices may be assigned, by the control node, one or more patterns to be used for D2D, where the set of potential patterns from which the assigned patterns are taken is specific for the control node.

Figure 8B:
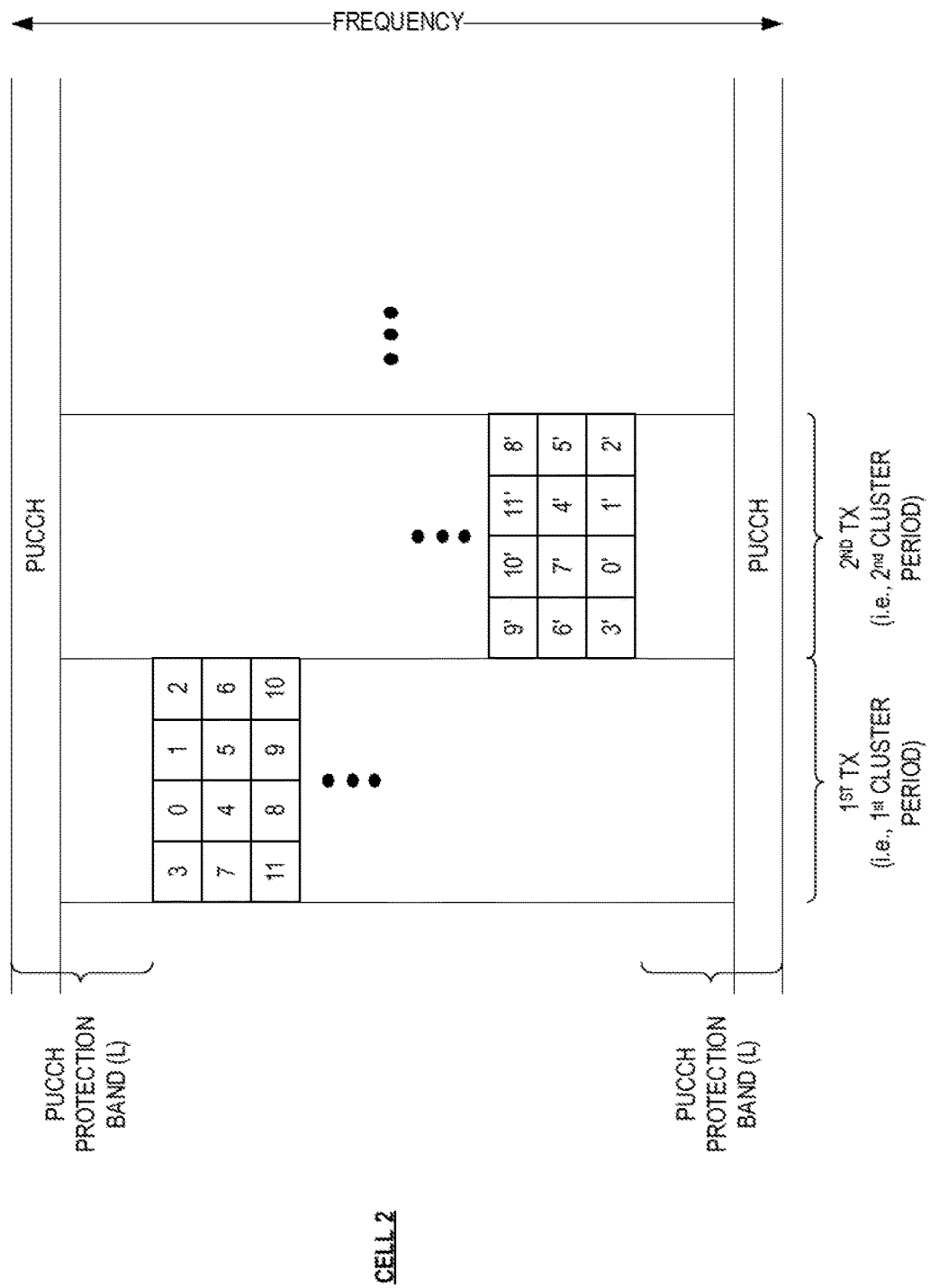

1. The patterns may be subject to a circular time shift according to some cell-specific parameter (e.g., the cell-ID or another cell-specific parameter). This allows the network to align or scramble D2D resources between proximal cells. If the wireless device specific patterns span cell-specific resources, the circular shift may consist of shifting the wireless device specific resources under the constraint that they still span only to the cell-specific resources. One example of this circular time shift is illustrated in FIGS. 8A, 8B, and 8C, where different shifts are used for different cells; and
2. Within a cell, the scheduler assigns (e.g., in step 102 of FIG. 4) patterns with increasing pattern index. In general, wireless devices that request D2D resources are always allocated to the available pattern with lowest index. For example, looking at the example patterns of FIG. 7; if all patterns are initially available, the scheduler first assigns pattern 0, then pattern 1, then pattern 2, and so on. This allows for at least intra-cell patterns orthogonality (if the scheduler is an eNB) and minimum fragmentation of cellular resources. If inter-cell resources coordination is possible, the joint scheduler may always assign a new assign pattern using the available suitable pattern with the lowest index taking into account the used patterns in the group of coordinated cells or schedulers.

As discussed above, a resource pattern is a subset of radio resources (time, frequency) that are used by a wireless device for sending a D2D signal. Patterns can be defined and assigned by a scheduler in a control node, which can indicate in a compact way a set of resources that have certain properties. One advantage recognizable to those of skill in the art is that the assignment of different patterns to different wireless devices in a D2D scheme facilitates the reduction of interference.

Examples of patterns that fulfil properties 3-6 above are provided in the following. The algorithms can be executed by processors either on the control node(s) (e.g., the radio base station 12) or on the first and second wireless devices 16, 20, or both. The resulting allocation patterns can also be stored in tables in memory associated with either the control node(s), the wireless devices, or both.

For these examples, the resource pattern is a Type-2 discovery resource pattern for 3GPP cellular communications networks. The assumptions are:

N discovery time resources;
F frequency domain resources (in the system bandwidth);
M (re)transmissions of each discovery message; and
L PUCCH protection resources close to band edges.

Within the discovery period, the N time resources are partitioned into M clusters. Each cluster has $K=N/M$ time resources.

The resource patterns are constructed in a time-first fashion. Each pattern spans all clusters and uses different frequency resources in the different clusters. Each cluster contains a specific retransmission index for all the patterns. Patterns receive a cluster-specific and frequency resource-specific cyclic rotations to shuffle time-domain collisions between different patterns. A possible scheduler strategy is to assign patterns with progressive pattern index in order to minimize cellular spectrum fragmentation. Different strategies are possible for inter-cell patterns assignment in case of inter-cell coordination. If inter-cell coordination is not used, a cell-specific cyclic resource shift (in time) can be applied to randomize inter-cell interference.

The resource patterns are defined mathematically (in formulas) as:

$f(p,m)=\text{floor}(p/K)+L$ (if $m$ even)

$f(p,m)=F-1-\text{floor}(p/K)-L$ (if $m$ odd)

$t(p,m)=m*K+\text{mod}(p+m*\text{floor}(p/K),K)$ $m=[0,M-1]$ is the cluster index $p=[0,(F-2*L)*K-1]$ is the pattern index $K=N/M$ where f(p,m) is an index of the frequency resource mapped to pattern index p in cluster m and t(p,m) is an index of the time resource mapped to the pattern index p in cluster m.

Note: shorter patterns with smaller values of M can be generated, if needed, by selecting a subset of the patterns defined above.

Figure 9:
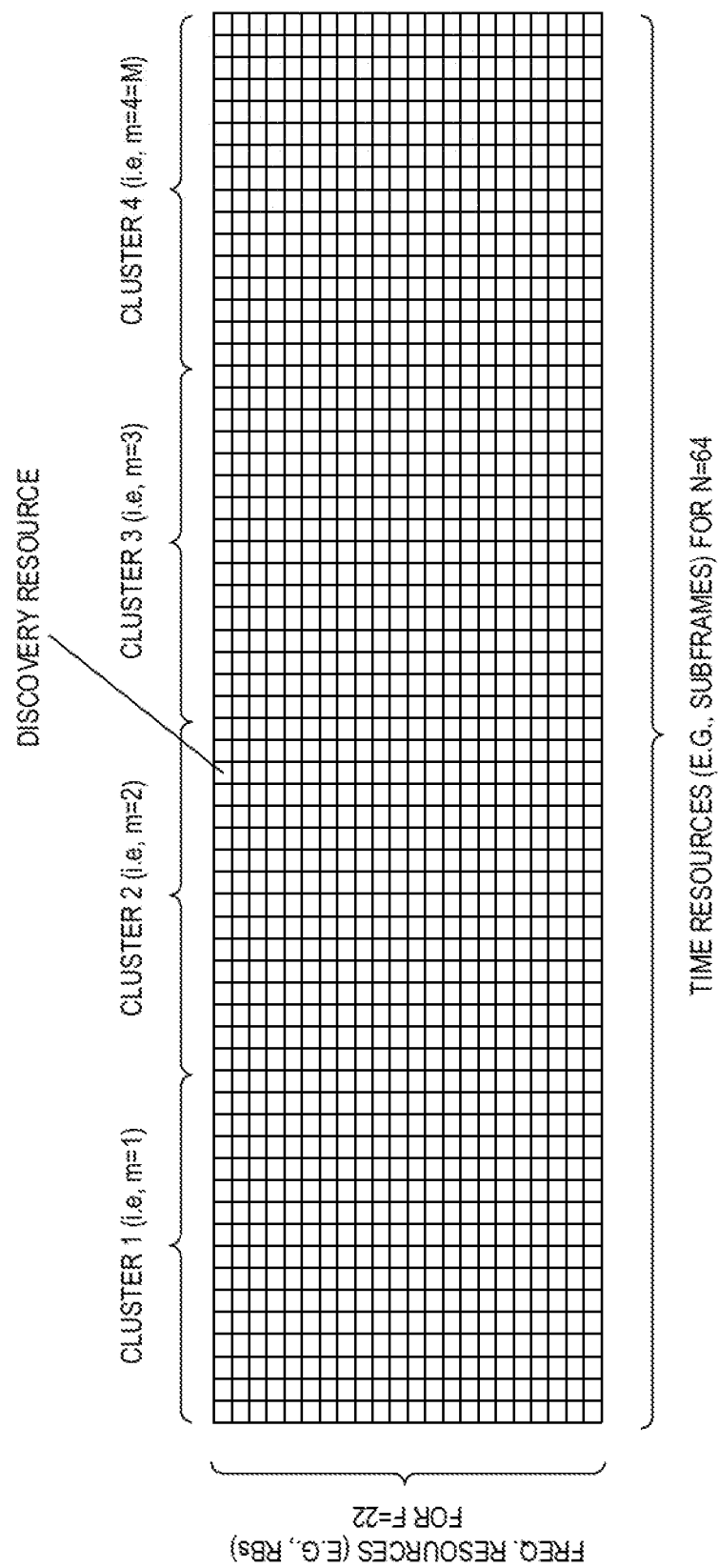
FIG. 9 illustrates one example of a pool of discovery resources within a discovery period according to some embodiments of the present disclosure.

As one specific example, consider the pool of resources illustrated in FIG. 9. This pool of discovery resources may be the time-frequency resources in a discovery period. In this example, N=64, M=4, and F=22. The PUCCH protection band is equal to two frequency resources (i.e., L=2). The following Matlab reference code can be used to generate the mapping between the pattern indices p=[0:(F−2*L)*K−1], where (F−2*L)*K is the number of resources in the pool, and the frequency resources f(p,m) and time resources t(p,m). In this code, the frequency resource mapping f(p,m) is stored as patterns(p,m,1) for p=[0:(F−2*L)*K−1] and m=[0,M−1], and the time resource mapping t(p,m) is stored as patterns(p,m,2) for p=[0:(F−2*L)*K−1] and m=[0,M−1].

Matlab Reference Code (Example Parameters):
N=64
M=4
K=N/M
L=2
F=22;
pv=[0:(F−2*L)*K−1];

```
patterns = zeros(length(pv),M,2);
for p = pv
    for m = 0:M-1
        if mod(m,2) == 0
            patterns(p+1,m+1,1) = floor(p/K) + L;
        else
            patterns(p+1,m+1,1) = F-1 -floor(p/K) - L;
        end
        patterns(p+1,m+1,2) = m*K + mod(p+m*floor(p/K),K);
    end
end
figure;plot(squeeze(patterns(:,:,2))',squeeze(patterns(:,:,1))','-s');grid;
```

The resulting mappings are illustrated in FIGS. 10A through 10D for clusters 1 through 4, respectively. The frequency resource indices are f=[0:21] and the time resource indices are t=[0:63]. The numbers inside the boxes are the pattern indices (i.e., the values of p). FIGS. 10A through 10D illustrate that pattern index 0 is mapped to frequency resource f=2 and time resource t=0 in cluster m=1, mapped to frequency resource f=19 and time resource t=16 in cluster m=2, mapped to frequency resource f=2 and time resource t=32 in cluster 3, and mapped to frequency resource f=19 and time resource t=48 in cluster m=4. Similarly, pattern index 16 is mapped to frequency resource f=3 and time resource t=0 in cluster m=1, mapped to frequency resource f=18 and time resource t=17 in cluster m=2, mapped to frequency resource f=3 and time resource t=34 in cluster m=3, and mapped to frequency resource t=18 and time resource t=51 in cluster m=4. The mappings for all of the patterns are similarly illustrated. These defined relationships between pattern indices and resources can be utilized by, e.g., the first wireless device 16 to determine the resources on which to transmit from the pattern index assigned to the first wireless device 16.

Other algorithms are also contemplated that would result in one or a combination of properties listed above. Other metrics can also be taken into consideration.

Figure 11:
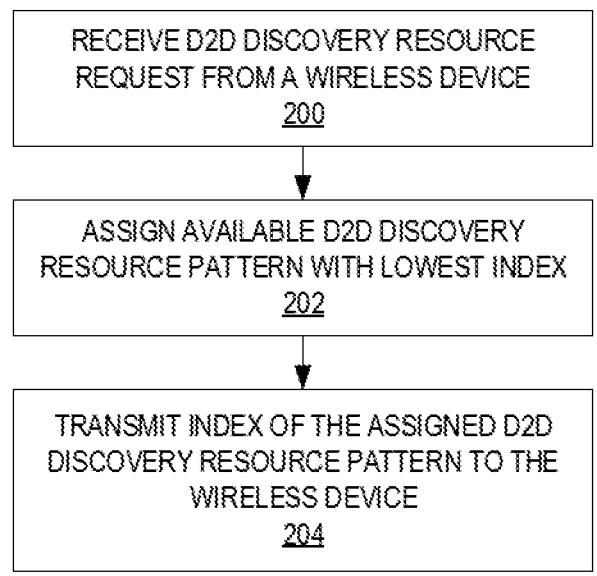
FIG. 11 is a flow chart that illustrates the operation of a control node (e.g., a base station) to assign pattern indices to a wireless device according to some embodiments of the present disclosure.

FIG. 11 is a flow chart that illustrates the operation of a control node (e.g., the radio base station 12) to assign pattern indices to wireless devices (e.g., the first and second wireless devices 16 and 20) according to some embodiments of the present disclosure. This process is described above, and FIG. 11 only serves to illustrate what has already been described. As illustrated, the control node receives a resource request from a wireless device (step 200). In response, the control node assigns a resource pattern having a lowest available pattern index to the wireless device (step 202). Using the example of FIGS. 10A through 10D, assigning the pattern indices in this manner operates to assign resources near the edge of the available bandwidth for D2D, thereby avoiding fragmentation of the unused discovery resources. This is beneficial if, for example, the wireless communications network 10 is an LTE network and the unassigned discovery resources are desired to be used for normal uplink traffic in the LTE network, which uses single carrier transmission (i.e., Discrete Fourier Transform (DFT)-spread Orthogonal Frequency Division Multiplexing (OFDM)). The control node then transmits, or otherwise communicates, the index of the assigned pattern to the wireless device (step 204).

Figure 12:
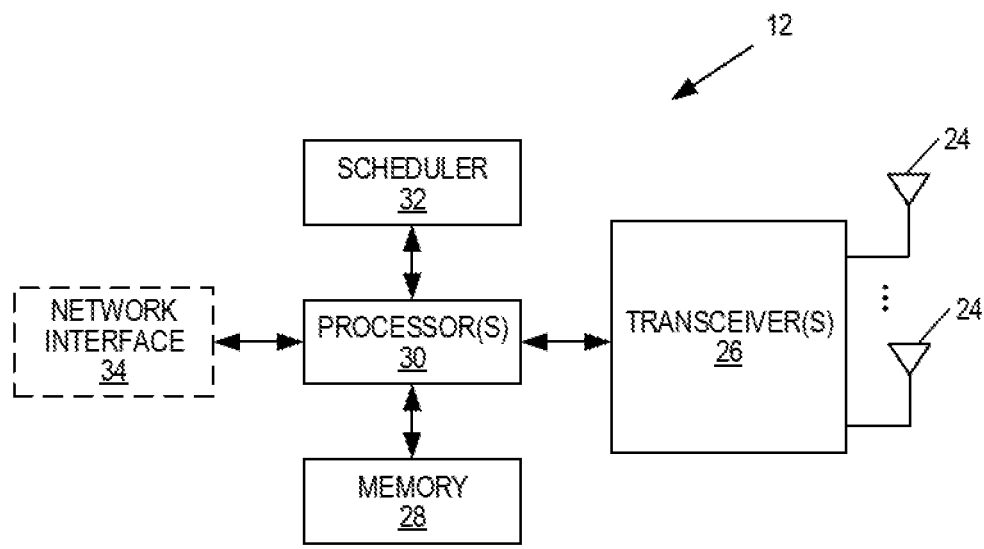
FIGS. 12 and 13 illustrate embodiments of a base station according to some embodiments of the present disclosure.

FIG. 12 is a schematic block diagram of the radio base station 12 in accordance with embodiments of the present disclosure. The radio base station 12 includes one or more antennas 24 and a transceiver(s) 26, which together facilitate reception and transmittal of wireless signals. The radio base station 12 also includes a memory 28 for storing, e.g., resource allocation patterns in tables. The tables may include indices pointing to particular patterns. The radio base station 12 can transmit patterns or indices to wireless devices (e.g., the first and second wireless devices 16 and 20) for use in D2D communications. The radio base station 12 also includes one or more processors 30 for processing instructions. The processor(s) 30 can be a general purpose processor, an Application Specific Integrated Circuit (ASIC), a special purpose processor, etc. The processor(s) 30 may include circuitry and corresponding software. For example, the processor(s) 30 can execute algorithms for defining patterns either for storage or on the fly. Examples of algorithms are provided herein. The radio base station 12 also includes a scheduler 32 that can also be involved in defining the resource allocation patterns. While illustrated separately, the scheduler 32 may be implemented in software (e.g., stored in the memory 28) that is executed by the processor(s) 30. The radio base station 12 may also include a network interface 34 enabling the radio base station 12 to, e.g., communicate with other radio base stations 12 and/or a core network of the wireless communications network 10.

In some embodiments, a computer program including instructions which, when executed by at least one processor, causes the at least one processor to carry out the functionality of the control node (e.g., the radio base station 12) according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 28).

Figure 13:
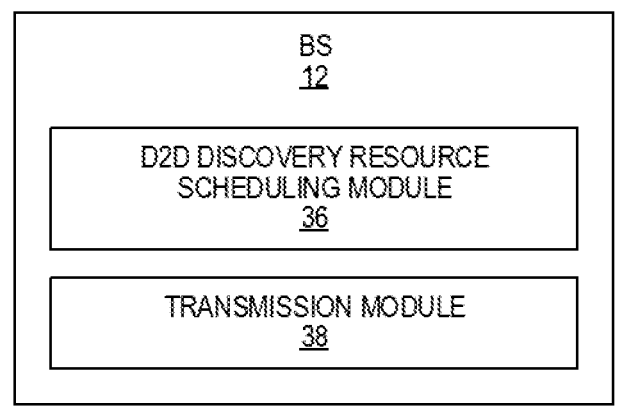

FIG. 13 illustrates the radio base station 12 according to some other embodiments of the present disclosure. As illustrated, the radio base station 12 includes a D2D discovery resource scheduling module 36 and a transmission module 38, each of which is implemented in software. The D2D discovery resource scheduling module 36 operates to assign patterns (pattern indices) to wireless devices as described above. The transmission module 38 operates to transmit, via an associated transceiver (not shown), the assigned pattern indices to the appropriate wireless devices.

Figure 14:
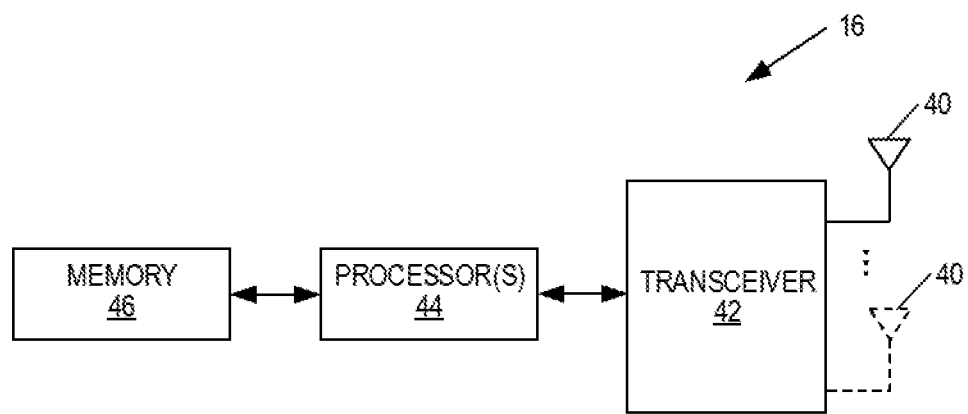
FIGS. 14 and 15 illustrate embodiments of the wireless device according to some embodiments of the present disclosure.

FIG. 14 is a schematic block diagram of the first wireless device 16 in accordance with embodiments of the present disclosure. This discussion equally applies to the second wireless device 20. The first wireless device 16 includes one or more antennas 40 and a transceiver 42 for sending and receiving wireless signals from the radio base station 12 or another wireless device (e.g., the second wireless device 20) or both. The first wireless device 16 also includes one or more processors 44 and memory 46. The processor(s) 44 can execute instructions stored in the memory 46. The memory 46 can store tables that include resource allocation patterns or can include indices pointing to resource allocation patterns. The first wireless device 16 can act as a transmitting wireless device for D2D communication and the first wireless device 16 can act as a receiving wireless device for D2D communication. The transmitting wireless device can transmit D2D signals, e.g. D2D discovery signals, according to a predefined pattern characterized by the properties described above. Similarly, the receiving wireless device can receive D2D signals, e.g. D2D discovery signals, according to a predefined pattern characterized by properties described above. The receiving wireless device can combine the resources in the decoder according to the predefined patterns.

In some embodiments, a computer program including instructions which, when executed by at least one processor, causes the at least one processor to carry out the functionality of the first and second wireless device 16, 20 according to any one of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 46).

Figure 15:
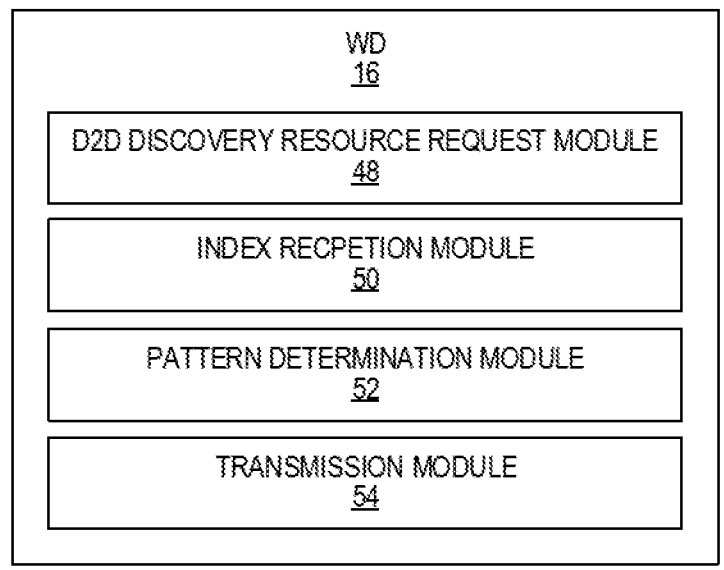

FIG. 15 is a schematic block diagram of the first wireless device 16 in accordance with some other embodiments of the present disclosure. This discussion equally applies to the second wireless device 20. The first wireless device 16 includes a D2D discovery resource request module 48, an index reception module 50, a pattern determination module 52, and a transmission module 54, each of which is implemented in software. The D2D discovery resource request module 48 operates to send a request for D2D discovery resources (via an associated transmitter of the first wireless device 16, which is not shown). The index reception module 50 operates to receive, via an associated receiver (not shown) of the first wireless device 16, a pattern index, as discussed above. The pattern determination module 52 then determines the D2D discovery resource pattern from the received index, as described above. The transmission module 54 then transmits a D2D discovery signal according to the D2D discovery resource pattern.

The following acronyms are used throughout this disclosure.
  3GPP Third Generation Partnership Project
  AGC Automatic Gain Control
  ASIC Application Specific Integrated Circuit
  CDM Code Division Multiplexing
  D2D Device-to-Device
  DFT Discrete Fourier Transform
  eNB Enhanced or Evolved Node B
  FDM Frequency Division Multiplexing
  GSM Global System for Mobile Communications
  ID Identifier
  IP Internet Protocol
  LTE Long Term Evolution
  MAC Medium Access Control
  OFDM Orthogonal Frequency Division Multiplexing
  PDA Personal Digital Assistant
  PDU Protocol Data Unit
  PLMN Public Land Mobile Network
  PUCCH Physical Uplink Control Channel
  RB Resource Block
  TDM Time Division Multiplexing
  UE User Equipment
  WCDMA Wideband Code Division Multiple Access
  WiMax Worldwide Interoperability for Microwave Access
  WLAN Wireless Local Area Network Those skilled in the art will recognize improvements and modifications to the embodiments of the present disclosure. All such improvements and modifications are considered within the scope of the concepts disclosed herein and the claims that follow.

What is claimed is:

1. A wireless device having cellular network assisted Device-to-Device (D2D) communication capabilities, the wireless device comprising:
   a transceiver;
   at least one processor; and
   memory containing instructions executable by the at least one processor whereby the wireless device is operable to transmit, via the transceiver, a D2D signal in a frequency band of a cellular network during a predefined D2D period according to one of a plurality of predefined D2D transmission patterns, the plurality of predefined D2D transmission patterns having at least one of the following properties:
   a cell-specific circular shift;
   the predefined D2D period comprising N time resources and F frequency resources defining a total of N× F D2D resources divided into M clusters, each cluster comprising K=N/M time resources, and each of the plurality of predefined D2D transmission patterns comprising at most one D2D resource in each of the M clusters, where M>1;
   the predefined D2D period comprising N time resources and F frequency resources defining a total of N× F D2D resources divided into M clusters, each cluster comprising K=N/M time resources, and the plurality of predefined D2D transmission patterns being assigned to each of the M clusters in a time-first fashion starting with frequency resources at either a lowest or highest available frequency for D2D communication in the frequency band of the cellular network;
   the predefined D2D period comprising N time resources and F frequency resources defining a total of N× F D2D resources divided into M clusters, each cluster comprising K=N/M time resources, and, for at least one of the plurality of predefined D2D transmission patterns, a relative mapping between a pattern index for the at least one of the plurality of predefined D2D transmission patterns and time resources within a cluster is different for different clusters and/or different frequency resources; and
   each pattern of the plurality of predefined D2D transmission patterns spans two frequency resources within the predefined D2D period,
   wherein, via execution of the instructions by the at least one processor, the wireless device is further operable to:
   receive, via the transceiver, the pattern index from a base station of the cellular network, the pattern index being an index for the one of the plurality of predefined D2D transmission patterns assigned to the wireless device, wherein the pattern index is a resource allocation that is valid for multiple predefined D2D periods;
   re-assign the pattern index to a different one of the plurality of predefined D2D transmission patterns for a subsequent predefined D2D period; and
   transmit a D2D signal in the frequency band of the cellular network during the subsequent predefined D2D period according to the different one of the plurality of predefined D2D transmission patterns.

2. The wireless device of claim 1, wherein the plurality of predefined D2D transmission patterns have the cell-specific circular shift.

3. The wireless device of claim 2, wherein each pattern of the plurality of predefined D2D transmission patterns spans the two frequency resources within the predefined D2D period.

4. The wireless device of claim 1, wherein the predefined D2D period comprises the N time resources and the F frequency resources defining the total of N× F D2D resources divided into the M clusters, each cluster comprising the K=N/M time resources where M>1, and wherein each of the plurality of predefined D2D transmission patterns comprises the at most one D2D resource in each of the M clusters.

5. The wireless device of claim 1, wherein the predefined D2D period comprises the N time resources and the F frequency resources defining the total of N× F D2D resources divided into the M clusters, each cluster comprising the K=N/M time resources, and wherein the plurality of predefined D2D transmission patterns are assigned to each of the M clusters in the time-first fashion starting with the frequency resources at either the lowest or highest available frequency for the D2D communication in the frequency band of the cellular network.

6. The wireless device of claim 1, wherein the predefined D2D period comprises the N time resources and the F frequency resources defining the total of N× F D2D resources divided into the M clusters, each cluster comprising the K=N/M time resources, and wherein, for the at least one of the plurality of predefined D2D transmission patterns, the relative mapping between the pattern index for the at least one of the plurality of predefined D2D transmission patterns and the time resources within the cluster is different for the different clusters and/or the different frequency resources.

7. The wireless device of claim 1, wherein each pattern of the plurality of predefined D2D transmission patterns spans the two frequency resources within the predefined D2D period.

8. The wireless device of claim 1, wherein the pattern index is re-assigned to the different one of the plurality of predefined D2D transmission patterns based on at least one of: the pattern index, one or more time-related parameters, a cell identifier of a serving cell of the wireless device, a Public Land Mobile Network (PLMN) identifier of the cellular network, and a carrier frequency of the frequency band of the cellular network.

9. The wireless device of claim 1, wherein the frequency band of the cellular network is an uplink frequency band of the cellular network.

10. The wireless device of claim 1, wherein the predefined D2D period is a predefined D2D discovery period comprising a plurality of subframes.

11. A method of operation of a wireless device having cellular network assisted Device-to-Device D2D communication capabilities, the method comprising:
transmitting a D2D signal in a frequency band of a cellular network during a predefined D2D period according to one of a plurality of predefined D2D transmission patterns, the plurality of predefined D2D transmission patterns having at least one of the following properties:
a cell-specific circular shift;
the predefined D2D period comprising N time resources and F frequency resources defining a total of N× F D2D resources divided into M clusters, each cluster comprising K=N/M time resources, and each of the plurality of predefined D2D transmission patterns comprising at most one D2D resource in each of the M clusters, where M>1;
the predefined D2D period comprising N time resources and F frequency resources defining a total of N× F D2D resources divided into M clusters, each cluster comprising K=N/M time resources, and the plurality of predefined D2D transmission patterns being assigned to each of the M clusters in a time-first fashion starting with frequency resources at either a lowest or highest available frequency for D2D communication in the frequency band of the cellular network;
the predefined D2D period comprising N time resources and F frequency resources defining a total of N× F D2D resources divided into M clusters, each cluster comprising K=N/M time resources, and, for at least one of the plurality of predefined D2D transmission patterns, a relative mapping between a pattern index for the at least one of the plurality of predefined D2D transmission patterns and time resources within a cluster is different for different clusters and/or different frequency resources; and
each pattern of the plurality of predefined D2D transmission patterns spans two frequency resources within the predefined D2D period;
receiving the pattern index from a base station of the cellular network, the pattern index being an index for the one of the plurality of predefined D2D transmission patterns assigned to the wireless device, wherein the pattern index is a resource allocation that is valid for multiple predefined D2D periods;
re-assigning the pattern index to a different one of the plurality of predefined D2D transmission patterns for a subsequent predefined D2D period; and
transmitting a D2D signal in the frequency band of the cellular network during the subsequent predefined D2D period according to the different one of the plurality of predefined D2D transmission patterns.

12. The method of claim 11, wherein the plurality of predefined D2D transmission patterns have the cell-specific circular shift.

13. The method of claim 12, wherein each pattern of the plurality of predefined D2D transmission patterns spans the two frequency resources within the predefined D2D period.

14. The method of claim 11, wherein the predefined D2D period comprises the N time resources and the F frequency resources defining the total of N× F D2D resources divided into the M clusters, each cluster comprising the K=N/M time resources where M>1, and wherein each of the plurality of predefined D2D transmission patterns comprises the at most one D2D resource in each of the M clusters.

15. The method of claim 11, wherein the predefined D2D period comprises the N time resources and the F frequency resources defining the total of N× F D2D resources divided into the M clusters, each cluster comprising the K=N/M time resources, and wherein the plurality of predefined D2D transmission patterns are assigned to each of the M clusters in the time-first fashion starting with the frequency resources at either the lowest or highest available frequency for the D2D communication in the frequency band of the cellular network.

16. The method of claim 11, wherein the predefined D2D period comprises the N time resources and the F frequency resources defining the total of N× F D2D resources divided into the M clusters, each cluster comprising K=N/M time resources, and wherein, for the at least one of the plurality of predefined D2D transmission patterns, the relative mapping between the pattern index for the at least one of the plurality of predefined D2D transmission patterns and the time resources within the cluster is different for the different clusters and/or the different frequency resources.

17. The method of claim 11, wherein each pattern of the plurality of predefined D2D transmission patterns spans the two frequency resources within the predefined D2D period.

18. The method of claim 11, wherein re-assigning the pattern index to the different one of the plurality of predefined D2D transmission patterns comprises re-assigning the pattern index to the different one of the plurality of predefined D2D transmission patterns based on at least one of: the pattern index, one or more time-related parameters, a cell identifier of a serving cell of the wireless device, a Public Land Mobile Network (PLMN) identifier of the cellular network, and a carrier frequency of the frequency band of the cellular network.

19. The method of claim 11, wherein the frequency band of the cellular network is an uplink frequency band of the cellular network.

20. The method of claim 11, wherein the predefined D2D period is a predefined D2D discovery period comprising a plurality of subframes.

* * * * *